(12) United States Patent
Amm

(10) Patent No.: US 6,707,591 B2
(45) Date of Patent: Mar. 16, 2004

(54) ANGLED ILLUMINATION FOR A SINGLE ORDER LIGHT MODULATOR BASED PROJECTION SYSTEM

(75) Inventor: David T. Amm, Kingston (CA)

(73) Assignee: Silicon Light Machines, Sunnyvale, CA (US)

( * ) Notice: Subject to any disclaimer, the term of this patent is extended or adjusted under 35 U.S.C. 154(b) by 47 days.

(21) Appl. No.: 09/930,831

(22) Filed: Aug. 15, 2001

(65) Prior Publication Data

US 2002/0186448 A1 Dec. 12, 2002

Related U.S. Application Data

(63) Continuation-in-part of application No. 09/832,672, filed on Apr. 10, 2001.

(51) Int. Cl.[7] ............................. G02B 26/00; H04N 9/12
(52) U.S. Cl. ..................... 359/290; 359/291; 348/742
(58) Field of Search ............................ 359/224, 291, 359/290, 833, 618, 627, 629, 638, 639, 640; 348/742, 744, 748

(56) References Cited

U.S. PATENT DOCUMENTS

| | | | |
|---|---|---|---|
| 1,525,550 A | 2/1925 | Jenkins | 359/291 |
| 1,548,262 A | 8/1925 | Freedman | 283/67 |
| 1,814,701 A | 7/1931 | Ives | 359/462 |
| 2,415,226 A | 2/1947 | Sziklai | 178/5.4 |
| 2,783,406 A | 2/1957 | Vanderhooft | 313/70 |
| 2,920,529 A | 1/1960 | Blythe | 88/73 |
| 2,991,690 A | 7/1961 | Grey et al. | 88/16.6 |
| 3,256,465 A | 6/1966 | Weissenstern et al. | 317/101 |
| 3,388,301 A | 6/1968 | James | 317/234 |
| 3,443,871 A | 5/1969 | Chitayat | 356/106 |
| 3,553,364 A | 1/1971 | Lee | 178/7.3 |
| 3,576,394 A | 4/1971 | Lee | 178/7.3 |
| 3,600,798 A | 8/1971 | Lee | 29/592 |
| 3,656,837 A | 4/1972 | Sandbank | 350/161 |
| 3,657,610 A | 4/1972 | Yamamoto et al. | 317/243 |
| 3,693,239 A | 9/1972 | Dix | 29/470 |
| 3,743,507 A | 7/1973 | Ih et al. | 96/81 |
| 3,752,563 A | 8/1973 | Torok et al. | 350/151 |
| 3,781,465 A | 12/1973 | Ernstoff et al. | 178/5.4 BD |
| 3,783,184 A | 1/1974 | Ernstoff et al. | 178/5.4 BD |

(List continued on next page.)

FOREIGN PATENT DOCUMENTS

| | | | |
|---|---|---|---|
| EP | 1 003 071 A2 | 5/2000 | G03B/27/72 |
| EP | 1 040 927 A2 | 10/2000 | B41J/2/455 |
| WO | WO 96/08031 | 3/1996 | H01J/29/12 |
| WO | WO 99/07146 | 2/1999 | H04N/7/16 |
| WO | WO 99/67671 | 12/1999 | G02B/26/08 |
| WO | WO 01/04674 A1 | 1/2001 | G02B/6/12 |

OTHER PUBLICATIONS

"Development of Digital MEMS–Based Display Technology Promises Improved Resolution, Contrast, And Speed", XP–000730009, 1997, p. 33 of 34.

(List continued on next page.)

Primary Examiner—Georgia Epps
Assistant Examiner—Timothy Thompson
(74) Attorney, Agent, or Firm—Haverstock & Owens LLP

(57) ABSTRACT

A display apparatus projects a two dimensional image onto a display screen and includes illumination optics, a light modulator, separating optics and scanning optics. The light modulator is optically coupled to the illumination optics such that in operation the illumination optics illuminate the light modulator with an off-axis illumination and further such that the light modulator directs light onto an optic axis for a bright pixel, thereby forming on-axis light, and away from the optic axis for a dark pixel, thereby forming off-axis light. The separating optics are coupled to the light modulator and separate the off-axis and on-axis light where the on-axis light produces a real and virtual image that is displayed by the projection and scanning optics.

38 Claims, 5 Drawing Sheets

U.S. PATENT DOCUMENTS

| | | | |
|---|---|---|---|
| 3,792,916 A | 2/1974 | Sarna | 350/163 |
| 3,802,769 A | 4/1974 | Rotz et al. | 352/43 |
| 3,811,186 A | 5/1974 | Larnerd et al. | 29/626 |
| 3,861,784 A | 1/1975 | Torok | 350/162 R |
| 3,862,360 A | 1/1975 | Dill et al. | 178/73.3 D |
| 3,871,014 A | 3/1975 | King et al. | 357/67 |
| 3,886,310 A | 5/1975 | Guldberg et al. | 178/7.5 D |
| 3,896,338 A | 7/1975 | Nathanson et al. | 315/373 |
| 3,915,548 A | 10/1975 | Opittek | 350/3.5 |
| 3,935,499 A | 1/1976 | Oess | 313/413 |
| 3,935,500 A | 1/1976 | Oess et al. | 313/495 |
| 3,938,881 A | 2/1976 | Biegelsen et al. | 350/161 |
| 3,941,456 A | 3/1976 | Schilz et al. | 350/161 |
| 3,942,245 A | 3/1976 | Jackson et al. | 29/591 |
| 3,943,281 A | 3/1976 | Keller et al. | 178/7.5 D |
| 3,947,105 A | 3/1976 | Smith | 353/121 |
| 3,969,611 A | 7/1976 | Fonteneau | 219/502 |
| 3,980,476 A | 9/1976 | Wysocki | 96/1.1 |
| 3,991,416 A | 11/1976 | Byles et al. | 340/324 R |
| 4,001,663 A | 1/1977 | Bray | 321/2 |
| 4,004,849 A | 1/1977 | Shattuck | 350/160 R |
| 4,006,968 A | 2/1977 | Ernstoff et al. | 350/160 LC |
| 4,009,939 A | 3/1977 | Okano | 350/162 SF |
| 4,011,009 A | 3/1977 | Lama et al. | 350/162 R |
| 4,012,116 A | 3/1977 | Yevick | 350/132 |
| 4,012,835 A | 3/1977 | Wallick | 29/591 |
| 4,017,158 A | 4/1977 | Booth | 350/162 SF |
| 4,020,381 A | 4/1977 | Oess et al. | 313/495 |
| 4,021,766 A | 5/1977 | Aine | 338/2 |
| 4,034,211 A | 7/1977 | Horst et al. | 235/61.12 N |
| 4,034,399 A | 7/1977 | Drukier et al. | 357/68 |
| 4,035,068 A | 7/1977 | Rawson | 353/122 |
| 4,067,129 A | 1/1978 | Abramson et al. | 40/563 |
| 4,084,437 A | 4/1978 | Finnegan | 73/361 |
| 4,090,219 A | 5/1978 | Ernstoff et al. | 358/59 |
| 4,093,346 A | 6/1978 | Nishino et al. | 350/162 SF |
| 4,093,921 A | 6/1978 | Buss | 325/459 |
| 4,093,922 A | 6/1978 | Buss | 325/459 |
| 4,100,579 A | 7/1978 | Ernstoff | 358/230 |
| 4,103,273 A | 7/1978 | Keller | 338/2 |
| 4,126,380 A | 11/1978 | Borm | 350/266 |
| 4,127,322 A | 11/1978 | Jacobson et al. | 353/31 |
| 4,135,502 A | 1/1979 | Peck | 128/76.5 |
| 4,139,257 A | 2/1979 | Matsumoto | 350/6.1 |
| 4,143,943 A | 3/1979 | Rawson | 350/120 |
| 4,163,570 A | 8/1979 | Greenaway | 283/8 A |
| 4,184,700 A | 1/1980 | Greenaway | 283/6 |
| 4,185,891 A | 1/1980 | Kaestner | 350/167 |
| 4,190,855 A | 2/1980 | Inoue | 357/80 |
| 4,195,915 A | 4/1980 | Lichty et al. | 350/345 |
| 4,205,428 A | 6/1980 | Ernstoff et al. | 29/592 R |
| 4,211,918 A | 7/1980 | Nyfeler et al. | 235/454 |
| 4,223,050 A | 9/1980 | Nyfeler et al. | 427/163 |
| 4,225,913 A | 9/1980 | Bray | 363/97 |
| 4,249,796 A | 2/1981 | Sincerbox et al. | 350/370 |
| 4,250,217 A | 2/1981 | Greenaway | 428/161 |
| 4,250,393 A | 2/1981 | Greenaway | 250/566 |
| 4,256,787 A | 3/1981 | Shaver et al. | 428/1 |
| 4,257,016 A | 3/1981 | Kramer, Jr. et al. | 322/7.51 |
| 4,290,672 A | 9/1981 | Whitefield | 350/358 |
| 4,295,145 A | 10/1981 | Latta | 346/108 |
| 4,311,999 A | 1/1982 | Upton et al. | 340/755 |
| 4,327,411 A | 4/1982 | Turner | 364/900 |
| 4,327,966 A | 5/1982 | Bloom | 350/162 R |
| 4,331,972 A | 5/1982 | Rajchman | 358/60 |
| 4,336,982 A | 6/1982 | Rector, Jr. | 350/358 |
| 4,338,660 A | 7/1982 | Kelley et al. | 364/200 |
| 4,343,535 A | 8/1982 | Bleha, Jr. | 350/342 |
| 4,346,965 A | 8/1982 | Sprague et al. | 350/358 |
| 4,348,079 A | 9/1982 | Johnson | 350/358 |
| 4,355,463 A | 10/1982 | Burns | 29/827 |
| 4,361,384 A | 11/1982 | Bosserman | 350/174 |
| 4,369,524 A | 1/1983 | Rawson et al. | 455/606 |
| 4,374,397 A | 2/1983 | Mir | 358/75 |
| 4,389,096 A | 6/1983 | Hori et al. | 350/339 R |
| 4,391,490 A | 7/1983 | Hartke | 350/356 |
| 4,396,246 A | 8/1983 | Holman | 350/96.14 |
| 4,398,798 A | 8/1983 | Krawczak et al. | 350/162.24 |
| 4,400,740 A | 8/1983 | Traino et al. | 358/293 |
| 4,408,884 A | 10/1983 | Kleinknecht et al. | 356/355 |
| 4,414,583 A | 11/1983 | Hooker, III | 358/300 |
| 4,417,386 A | 11/1983 | Exner | 29/590 |
| 4,418,397 A | 11/1983 | Brantingham et al. | 364/900 |
| 4,420,717 A | 12/1983 | Wallace et al. | 318/696 |
| 4,422,099 A | 12/1983 | Wolfe | 358/293 |
| 4,426,768 A | 1/1984 | Black et al. | 29/583 |
| 4,430,584 A | 2/1984 | Someshwar et al. | 307/465 |
| 4,435,041 A | 3/1984 | Torok et al. | 350/162.24 |
| 4,440,839 A | 4/1984 | Mottier | 430/2 |
| 4,443,819 A | 4/1984 | Funada et al. | 358/236 |
| 4,443,845 A | 4/1984 | Hamilton et al. | 364/200 |
| 4,447,881 A | 5/1984 | Brantingham et al. | 364/488 |
| 4,454,591 A | 6/1984 | Lou | 364/900 |
| 4,456,338 A | 6/1984 | Gelbart | 350/358 |
| 4,460,907 A | 7/1984 | Nelson | 346/153.1 |
| 4,462,046 A | 7/1984 | Spight | 358/101 |
| 4,467,342 A | 8/1984 | Tower | 357/30 |
| 4,468,725 A | 8/1984 | Venturini | 363/160 |
| 4,483,596 A | 11/1984 | Marshall | 350/385 |
| 4,484,188 A | 11/1984 | Ott | 340/728 |
| 4,487,677 A | 12/1984 | Murphy | 204/247 |
| 4,492,435 A | 1/1985 | Banton et al. | 350/360 |
| 4,503,494 A | 3/1985 | Hamilton et al. | 364/200 |
| 4,511,220 A | 4/1985 | Scully | 350/403 |
| 4,538,883 A | 9/1985 | Sprague et al. | 350/356 |
| 4,545,610 A | 10/1985 | Lakritz et al. | 29/589 |
| 4,556,378 A | 12/1985 | Nyfeler et al. | 425/143 |
| 4,558,171 A | 12/1985 | Gantley et al. | 174/52 FP |
| 4,561,044 A | 12/1985 | Ogura et al. | 362/84 |
| 4,566,935 A | 1/1986 | Hornbeck | 156/626 |
| 4,567,585 A | 1/1986 | Gelbart | 369/97 |
| 4,571,041 A | 2/1986 | Gaudyn | 353/10 |
| 4,571,603 A | 2/1986 | Hornbeck et al. | 346/160 |
| 4,577,932 A | 3/1986 | Gelbart | 350/358 |
| 4,577,933 A | 3/1986 | Yip et al. | 350/358 |
| 4,588,957 A | 5/1986 | Balant et al. | 330/4.3 |
| 4,590,548 A | 5/1986 | Maytum | 363/161 |
| 4,594,501 A | 6/1986 | Culley et al. | 219/492 |
| 4,596,992 A | 6/1986 | Hornbeck | 346/76 PH |
| 4,615,595 A | 10/1986 | Hornbeck | 353/122 |
| 4,623,219 A | 11/1986 | Trias | 350/351 |
| 4,636,039 A | 1/1987 | Turner | 350/356 |
| 4,636,866 A | 1/1987 | Hattori | 358/236 |
| 4,641,193 A | 2/1987 | Glenn | 358/233 |
| 4,645,881 A | 2/1987 | LeToumelin et al. | 379/252 |
| 4,646,158 A | 2/1987 | Ohno et al. | 358/236 |
| 4,649,085 A | 3/1987 | Landram | 428/620 |
| 4,649,432 A | 3/1987 | Watanabe | 358/241 |
| 4,652,932 A | 3/1987 | Miyajima et al. | 358/236 |
| 4,655,539 A | 4/1987 | Caulfield et al. | 350/3.6 |
| 4,660,938 A | 4/1987 | Kazan | 350/355 |
| 4,661,828 A | 4/1987 | Miller, Jr. et al. | 346/108 |
| 4,662,746 A | 5/1987 | Hornbeck | 350/269 |
| 4,663,670 A | 5/1987 | Ito et al. | 358/245 |
| 4,687,326 A | 8/1987 | Corby, Jr. | 356/5 |
| 4,698,602 A | 10/1987 | Armitage | 332/7.51 |
| 4,700,276 A | 10/1987 | Freyman et al. | 361/403 |
| 4,707,064 A | 11/1987 | Dobrowolski et al. | 350/96.19 |
| 4,709,995 A | 12/1987 | Kuribayashi et al. | 350/350 |
| 4,710,732 A | 12/1987 | Hornbeck | 332/7.51 |
| 4,711,526 A | 12/1987 | Hennings et al. | 350/170 |

| Patent | Date | Inventor | Class |
|---|---|---|---|
| 4,714,326 A | 12/1987 | Usui et al. | 350/485 |
| 4,717,066 A | 1/1988 | Goldenberg et al. | 228/179 |
| 4,719,507 A | 1/1988 | Bos | 358/92 |
| 4,721,629 A | 1/1988 | Sakai et al. | 427/35 |
| 4,722,593 A | 2/1988 | Shimazaki | 350/336 |
| 4,724,467 A | 2/1988 | Yip et al. | 355/71 |
| 4,728,185 A | 3/1988 | Thomas | 353/122 |
| 4,743,091 A | 5/1988 | Gelbart | 350/252 |
| 4,744,633 A | 5/1988 | Sheiman | 350/132 |
| 4,747,671 A | 5/1988 | Takahashi et al. | 350/336 |
| 4,751,509 A | 6/1988 | Kubota et al. | 340/784 |
| 4,761,253 A | 8/1988 | Antes | 264/1.3 |
| 4,763,975 A | 8/1988 | Scifres et al. | 350/96.15 |
| 4,765,865 A | 8/1988 | Gealer et al. | 156/647 |
| 4,772,094 A | 9/1988 | Sheiman | 350/133 |
| 4,797,694 A | 1/1989 | Agostinelli et al. | 346/160 |
| 4,797,918 A | 1/1989 | Lee et al. | 380/20 |
| 4,801,194 A | 1/1989 | Agostinelli et al. | 350/356 |
| 4,803,560 A | 2/1989 | Matsunaga et al. | 359/236 |
| 4,804,641 A | 2/1989 | Arlt et al. | 437/227 |
| 4,807,021 A | 2/1989 | Okumura | 357/75 |
| 4,807,965 A | 2/1989 | Garakani | 350/131 |
| 4,809,078 A | 2/1989 | Yabe et al. | 358/236 |
| 4,811,082 A | 3/1989 | Jacobs et al. | 357/80 |
| 4,811,210 A | 3/1989 | McAulay | 364/200 |
| 4,814,759 A | 3/1989 | Gombrich et al. | 340/771 |
| 4,817,850 A | 4/1989 | Wiener-Avnear et al. | 228/119 |
| 4,824,200 A | 4/1989 | Isono et al. | 350/96.16 |
| 4,827,391 A | 5/1989 | Sills | 363/41 |
| 4,829,365 A | 5/1989 | Eichenlaub | 358/3 |
| 4,836,649 A | 6/1989 | Ledebuhr et al. | 350/331 R |
| 4,856,863 A | 8/1989 | Sampsell et al. | 350/96.16 |
| 4,856,869 A | 8/1989 | Sakata et al. | 350/162.18 |
| 4,859,012 A | 8/1989 | Cohn | 350/96.24 |
| 4,859,060 A | 8/1989 | Katagiri et al. | 356/352 |
| 4,866,488 A | 9/1989 | Frensley | 357/4 |
| 4,882,683 A | 11/1989 | Rupp et al. | 364/521 |
| 4,893,509 A | 1/1990 | MacIver et al. | 73/517 AV |
| 4,896,325 A | 1/1990 | Coldren | 372/20 |
| 4,896,948 A | 1/1990 | Dono et al. | 350/355 |
| 4,897,708 A | 1/1990 | Clements | 357/65 |
| 4,902,083 A | 2/1990 | Wells | 350/6.6 |
| 4,915,463 A | 4/1990 | Barbee, Jr. | 350/1.1 |
| 4,915,479 A | 4/1990 | Clarke | 350/345 |
| 4,924,413 A | 5/1990 | Suwannukul | 364/521 |
| 4,926,241 A | 5/1990 | Carey | 357/75 |
| 4,930,043 A | 5/1990 | Wiegand | 361/283 |
| 4,934,773 A | 6/1990 | Becker | 350/6.6 |
| 4,940,309 A | 7/1990 | Baum | 350/171 |
| 4,943,815 A | 7/1990 | Aldrich et al. | 346/108 |
| 4,945,773 A | 8/1990 | Sickafus | 73/862.59 |
| 4,949,148 A | 8/1990 | Bartelink | 357/74 |
| 4,950,890 A | 8/1990 | Gelbart | 250/237 G |
| 4,952,925 A | 8/1990 | Haastert | 340/784 |
| 4,954,789 A | 9/1990 | Sampsell | 330/4.3 |
| 4,956,619 A | 9/1990 | Hornbeck | 330/4.3 |
| 4,961,633 A | 10/1990 | Ibrahim et al. | 350/392 |
| 4,963,012 A | 10/1990 | Tracy et al. | 350/641 |
| 4,970,575 A | 11/1990 | Soga et al. | 357/72 |
| 4,978,202 A | 12/1990 | Yang | 350/331 R |
| 4,982,184 A | 1/1991 | Kirkwood | 340/783 |
| 4,982,265 A | 1/1991 | Watanabe et al. | 357/75 |
| 4,984,824 A | 1/1991 | Antes et al. | 283/91 |
| 4,999,308 A | 3/1991 | Nishiura et al. | 437/4 |
| 5,003,300 A | 3/1991 | Wells | 340/705 |
| 5,009,473 A | 4/1991 | Hunter et al. | 350/6.6 |
| 5,013,141 A | 5/1991 | Sakata | 350/348 |
| 5,018,256 A | 5/1991 | Hornbeck | 29/25.01 |
| 5,022,750 A | 6/1991 | Flasck | 353/31 |
| 5,023,905 A | 6/1991 | Wells et al. | 379/96 |
| 5,024,494 A | 6/1991 | Williams et al. | 350/3.6 |
| 5,028,939 A | 7/1991 | Hornbeck et al. | 346/160 |
| 5,035,473 A | 7/1991 | Kuwayama et al. | 350/3.7 |
| 5,037,173 A | 8/1991 | Sampsell et al. | 385/17 |
| 5,039,628 A | 8/1991 | Carey | 437/183 |
| 5,040,052 A | 8/1991 | McDavid | 357/80 |
| 5,041,395 A | 8/1991 | Steffen | 437/206 |
| 5,041,851 A | 8/1991 | Nelson | 346/160 |
| 5,043,917 A | 8/1991 | Okamoto | 364/518 |
| 5,048,077 A | 9/1991 | Wells et al. | 379/96 |
| 5,049,901 A | 9/1991 | Gelbart | 346/108 |
| 5,058,992 A | 10/1991 | Takahashi | 359/567 |
| 5,060,058 A | 10/1991 | Goldenberg et al. | 358/60 |
| 5,061,049 A | 10/1991 | Hornbeck | 359/224 |
| 5,066,614 A | 11/1991 | Dunaway et al. | 437/209 |
| 5,068,205 A | 11/1991 | Baxter et al. | 437/205 |
| 5,072,239 A | 12/1991 | Mitcham et al. | 346/108 |
| 5,072,418 A | 12/1991 | Boutaud et al. | 364/715.06 |
| 5,074,947 A | 12/1991 | Estes et al. | 156/307.3 |
| 5,075,940 A | 12/1991 | Kuriyama et al. | 29/25.03 |
| 5,162,787 A | 11/1992 | Thompson et al. | 340/794 |
| 5,164,019 A | 11/1992 | Sinton | 136/249 |
| 5,165,013 A | 11/1992 | Faris | 395/104 |
| 5,168,401 A | 12/1992 | Endriz | 359/625 |
| 5,168,406 A | 12/1992 | Nelson | 359/855 |
| 5,170,156 A | 12/1992 | DeMond et al. | 340/794 |
| 5,170,269 A | 12/1992 | Lin et al. | 359/9 |
| 5,170,283 A | 12/1992 | O'Brien et al. | 359/291 |
| 5,172,161 A | 12/1992 | Nelson | 355/200 |
| 5,172,262 A | 12/1992 | Hornbeck | 359/223 |
| 5,177,724 A | 1/1993 | Gelbart | 369/44.16 |
| 5,178,728 A | 1/1993 | Boysel et al. | 156/656 |
| 5,179,274 A | 1/1993 | Sampsell | 250/208.2 |
| 5,179,367 A | 1/1993 | Shimizu | 340/700 |
| 5,181,231 A | 1/1993 | Parikh et al. | 377/26 |
| 5,182,665 A | 1/1993 | O'Callaghan et al. | 359/95 |
| 5,185,660 A * | 2/1993 | Um | 358/60 |
| 5,188,280 A | 2/1993 | Nakao et al. | 228/123 |
| 5,189,404 A | 2/1993 | Masimo et al. | 340/720 |
| 5,189,505 A | 2/1993 | Bartelink | 257/419 |
| 5,191,405 A | 3/1993 | Tomita et al. | 257/777 |
| 5,192,864 A | 3/1993 | McEwen et al. | 250/234 |
| 5,192,946 A | 3/1993 | Thompson et al. | 340/794 |
| 5,198,895 A | 3/1993 | Vick | 358/103 |
| 5,202,785 A | 4/1993 | Nelson | 359/214 |
| 5,206,629 A | 4/1993 | DeMond et al. | 340/719 |
| 5,208,818 A | 5/1993 | Gelbart et al. | 372/30 |
| 5,208,891 A | 5/1993 | Prysner | 385/116 |
| 5,210,637 A | 5/1993 | Puzey | 359/263 |
| 5,212,115 A | 5/1993 | Cho et al. | 437/208 |
| 5,212,555 A | 5/1993 | Stoltz | 358/206 |
| 5,212,582 A | 5/1993 | Nelson | 359/224 |
| 5,214,308 A | 5/1993 | Nishiguchi et al. | 257/692 |
| 5,214,419 A | 5/1993 | DeMond et al. | 340/794 |
| 5,214,420 A | 5/1993 | Thompson et al. | 340/795 |
| 5,216,537 A | 6/1993 | Hornbeck | 359/291 |
| 5,216,544 A | 6/1993 | Horikawa et al. | 359/622 |
| 5,219,794 A | 6/1993 | Satoh et al. | 437/209 |
| 5,220,200 A | 6/1993 | Blanton | 257/778 |
| 5,221,400 A | 6/1993 | Staller et al. | 156/292 |
| 5,221,982 A | 6/1993 | Faris | 359/93 |
| 5,224,088 A | 6/1993 | Atiya | 369/97 |
| 5,226,099 A | 7/1993 | Mignardi et al. | 385/19 |
| 5,230,005 A | 7/1993 | Rubino et al. | 372/20 |
| 5,231,363 A | 7/1993 | Sano et al. | 332/109 |
| 5,231,388 A | 7/1993 | Stoltz | 340/783 |
| 5,231,432 A | 7/1993 | Glenn | 353/31 |
| 5,233,456 A | 8/1993 | Nelson | 359/214 |
| 5,233,460 A | 8/1993 | Partlo et al. | 359/247 |
| 5,233,874 A | 8/1993 | Putty et al. | 73/517 AV |
| 5,296,891 A | 3/1994 | Vogt et al. | 355/67 |
| 5,303,043 A * | 4/1994 | Glenn | 348/40 |

| | | | | | | |
|---|---|---|---|---|---|---|
| 5,311,360 A | 5/1994 | Bloom et al. ............... 359/572 | 5,445,559 A | 8/1995 | Gale et al. ................. 451/388 |
| 5,313,648 A | 5/1994 | Ehlig et al. ................. 395/800 | 5,446,479 A | 8/1995 | Thompson et al. ......... 345/139 |
| 5,313,835 A | 5/1994 | Dunn .......................... 73/505 | 5,447,600 A | 9/1995 | Webb ............................ 216/2 |
| 5,315,418 A | 5/1994 | Sprague et al. ............... 359/41 | 5,448,314 A | 9/1995 | Heimbuch et al. .......... 348/743 |
| 5,315,423 A | 5/1994 | Hong .......................... 359/124 | 5,448,546 A | 9/1995 | Pauli .......................... 369/112 |
| 5,319,214 A | 6/1994 | Gregory et al. ......... 250/504 R | 5,450,088 A | 9/1995 | Meier et al. ................. 342/51 |
| 5,319,668 A | 6/1994 | Luecke ....................... 372/107 | 5,450,219 A | 9/1995 | Gold et al. ................... 359/40 |
| 5,319,789 A | 6/1994 | Ehlig et al. ................. 395/800 | 5,451,103 A | 9/1995 | Hatanaka et al. ........... 353/313 |
| 5,319,792 A | 6/1994 | Ehlig et al. ................. 395/800 | 5,452,024 A | 9/1995 | Sampsell .................... 348/755 |
| 5,321,416 A | 6/1994 | Bassett et al. .................. 345/8 | 5,452,138 A | 9/1995 | Mignardi et al. ........... 359/855 |
| 5,323,002 A | 6/1994 | Sampsell et al. ......... 250/252.1 | 5,453,747 A | 9/1995 | D'Hont et al. ................ 342/42 |
| 5,323,051 A | 6/1994 | Adams et al. ............... 257/417 | 5,453,778 A | 9/1995 | Venkateswar et al. ...... 347/239 |
| 5,325,116 A | 6/1994 | Sampsell .................... 346/108 | 5,453,803 A | 9/1995 | Shapiro et al. ............. 353/119 |
| 5,327,286 A | 7/1994 | Sampsell et al. ........... 359/561 | 5,454,160 A | 10/1995 | Nickel ......................... 29/840 |
| 5,329,289 A | 7/1994 | Sakamoto et al. .......... 345/126 | 5,454,906 A | 10/1995 | Baker et al. .................. 216/66 |
| 5,330,301 A | 7/1994 | Brancher .................... 414/417 | 5,455,445 A | 10/1995 | Kurtz et al. ................. 257/419 |
| 5,330,878 A | 7/1994 | Nelson ....................... 430/311 | 5,455,455 A | 10/1995 | Badehi ........................ 257/690 |
| 5,331,454 A | 7/1994 | Hornbeck ................... 359/224 | 5,455,602 A | 10/1995 | Tew ............................ 347/239 |
| 5,334,991 A | 8/1994 | Wells et al. .................... 345/8 | 5,457,493 A | 10/1995 | Leddy et al. ................ 348/164 |
| 5,339,116 A | 8/1994 | Urbanus et al. ............. 348/716 | 5,457,566 A | 10/1995 | Sampsell et al. ............ 359/292 |
| 5,339,177 A | 8/1994 | Jenkins et al. ................ 359/35 | 5,457,567 A | 10/1995 | Shinohara ................... 359/305 |
| 5,340,772 A | 8/1994 | Rosotker ..................... 437/222 | 5,458,716 A | 10/1995 | Alfaro et al. ................ 156/245 |
| 5,345,521 A | 9/1994 | McDonald et al. ........... 385/19 | 5,459,492 A | 10/1995 | Venkateswar ............... 347/253 |
| 5,347,321 A | 9/1994 | Gove .......................... 348/663 | 5,459,528 A | 10/1995 | Pettitt ......................... 348/568 |
| 5,347,378 A | 9/1994 | Handschy et al. ............. 359/53 | 5,459,592 A | 10/1995 | Shibatani et al. ............. 359/40 |
| 5,347,433 A | 9/1994 | Sedlmayr ..................... 362/32 | 5,459,610 A | 10/1995 | Bloom et al. ............... 359/572 |
| 5,348,619 A | 9/1994 | Bohannon et al. .......... 156/664 | 5,461,197 A | 10/1995 | Hiruta et al. ............... 174/52.4 |
| 5,349,687 A | 9/1994 | Ehlig et al. ................. 395/800 | 5,461,410 A | 10/1995 | Venkateswar et al. ...... 347/240 |
| 5,351,052 A | 9/1994 | D'Hont et al. ................ 342/42 | 5,461,411 A | 10/1995 | Florence et al. ............ 347/240 |
| 5,352,926 A | 10/1994 | Andrews .................... 257/717 | 5,461,547 A | 10/1995 | Ciupke et al. ................ 362/31 |
| 5,354,416 A | 10/1994 | Okudaira et al. ........... 156/643 | 5,463,347 A | 10/1995 | Jones et al. ................. 330/253 |
| 5,357,369 A | 10/1994 | Pilling et al. ............... 359/462 | 5,463,497 A | 10/1995 | Muraki et al. .............. 359/618 |
| 5,357,803 A | 10/1994 | Lane ........................ 73/517 B | 5,465,175 A | 11/1995 | Woodgate et al. .......... 359/463 |
| 5,359,349 A | 10/1994 | Jambor et al. .............. 345/168 | 5,467,106 A | 11/1995 | Salomon ....................... 345/87 |
| 5,359,451 A | 10/1994 | Gelbart et al. .............. 359/285 | 5,467,138 A | 11/1995 | Gove .......................... 348/452 |
| 5,361,131 A | 11/1994 | Tekemori et al. ........... 356/355 | 5,467,146 A | 11/1995 | Huang et al. ............... 348/743 |
| 5,363,220 A | 11/1994 | Kuwayama et al. ........... 359/3 | 5,469,302 A | 11/1995 | Lim ............................ 359/846 |
| 5,365,283 A | 11/1994 | Doherty et al. ............. 348/743 | 5,471,341 A | 11/1995 | Warde et al. ................ 359/293 |
| 5,367,585 A | 11/1994 | Ghezzo et al. ................ 385/23 | 5,473,512 A | 12/1995 | Degani et al. ............... 361/760 |
| 5,370,742 A | 12/1994 | Mitchell et al. .............. 134/10 | 5,475,236 A | 12/1995 | Yoshizaki ..................... 257/48 |
| 5,371,543 A | 12/1994 | Anderson ................... 348/270 | 5,480,839 A | 1/1996 | Ezawa et al. ............... 437/209 |
| 5,371,618 A | 12/1994 | Tai et al. ....................... 359/53 | 5,481,118 A | 1/1996 | Tew ............................ 250/551 |
| 5,377,705 A | 1/1995 | Smith, Jr. et al. .......... 134/95.3 | 5,481,133 A | 1/1996 | Hsu ............................ 257/621 |
| 5,382,961 A | 1/1995 | Gale, Jr. ..................... 345/108 | 5,482,564 A | 1/1996 | Douglas et al. ............... 134/18 |
| 5,387,924 A | 2/1995 | Gale, Jr. et al. ............ 345/108 | 5,482,818 A | 1/1996 | Nelson ....................... 430/394 |
| 5,389,182 A | 2/1995 | Mignardi .................... 156/334 | 5,483,307 A | 1/1996 | Anderson ..................... 353/98 |
| 5,391,881 A | 2/1995 | Jeuch et al. ............. 250/370.09 | 5,485,172 A | 1/1996 | Sawachika et al. ............ 345/8 |
| 5,392,140 A | 2/1995 | Ezra et al. .................... 359/41 | 5,485,304 A | 1/1996 | Kaeriyama .................. 359/291 |
| 5,392,151 A | 2/1995 | Nelson ....................... 359/223 | 5,485,354 A | 1/1996 | Ciupke et al. ................ 362/31 |
| 5,394,303 A | 2/1995 | Yamaji ....................... 361/749 | 5,486,698 A | 1/1996 | Hanson et al. .............. 250/332 |
| 5,398,071 A | 3/1995 | Gove et al. ................. 348/558 | 5,486,841 A | 1/1996 | Hara et al. ...................... 345/8 |
| 5,399,898 A | 3/1995 | Rostoker ..................... 257/499 | 5,486,946 A | 1/1996 | Jachimowicz et al. ....... 359/263 |
| 5,404,365 A | 4/1995 | Hiiro ............................ 372/27 | 5,488,431 A | 1/1996 | Gove et al. ................. 348/716 |
| 5,404,485 A | 4/1995 | Ban ............................ 395/425 | 5,489,952 A | 2/1996 | Gove et al. ................. 348/771 |
| 5,408,123 A | 4/1995 | Murai ......................... 257/531 | 5,490,009 A | 2/1996 | Venkateswar et al. ...... 359/291 |
| 5,410,315 A | 4/1995 | Huber .......................... 342/42 | 5,491,510 A | 2/1996 | Gove ............................ 348/77 |
| 5,411,769 A | 5/1995 | Hornbeck ................... 427/534 | 5,491,612 A | 2/1996 | Nicewarner, Jr. ........... 361/760 |
| 5,412,186 A | 5/1995 | Gale ........................... 219/679 | 5,491,715 A | 2/1996 | Flaxl .......................... 375/344 |
| 5,412,501 A | 5/1995 | Fisli ........................... 359/286 | 5,493,177 A | 2/1996 | Muller et al. ............... 313/578 |
| 5,418,584 A | 5/1995 | Larson ....................... 353/122 | 5,493,439 A | 2/1996 | Engle ......................... 359/292 |
| 5,420,655 A | 5/1995 | Shimizu ....................... 353/33 | 5,497,172 A | 3/1996 | Doherty et al. ............... 345/85 |
| 5,420,722 A | 5/1995 | Bielak ........................ 359/708 | 5,497,197 A | 3/1996 | Gove et al. ................. 348/388 |
| 5,426,072 A | 6/1995 | Finnila ........................ 437/208 | 5,497,262 A | 3/1996 | Kaeriyama .................. 359/223 |
| 5,427,975 A | 6/1995 | Sparks et al. ................. 437/79 | 5,499,060 A | 3/1996 | Gove et al. ................. 348/651 |
| 5,430,524 A | 7/1995 | Nelson ....................... 355/200 | 5,499,062 A | 3/1996 | Urbanus .................... 348/771 |
| 5,435,876 A | 7/1995 | Alfaro et al. ................ 156/247 | 5,500,761 A | 3/1996 | Goossen et al. ............ 359/290 |
| 5,438,477 A | 8/1995 | Pasch ......................... 361/689 | 5,502,481 A | 3/1996 | Dentinger et al. ............ 348/51 |
| 5,439,731 A | 8/1995 | Li et al. ...................... 428/209 | 5,504,504 A | 4/1996 | Markandey et al. ......... 345/214 |
| 5,442,411 A | 8/1995 | Urbanus et al. ............. 348/771 | 5,504,514 A | 4/1996 | Nelson ....................... 347/130 |
| 5,442,414 A | 8/1995 | Janssen et al. ................ 353/98 | 5,504,575 A | 4/1996 | Stafford ..................... 356/330 |
| 5,444,566 A | 8/1995 | Gale et al. .................. 359/291 | 5,504,614 A | 4/1996 | Webb et al. ................. 359/223 |

| | | | | | | | |
|---|---|---|---|---|---|---|---|
| 5,506,171 A | 4/1996 | Leonard et al. ............ 437/187 | | 5,793,519 A | 8/1998 | Furlani et al. ............. 359/291 |
| 5,506,597 A | 4/1996 | Thompson et al. .......... 345/85 | | 5,798,743 A | 8/1998 | Bloom ........................ 345/90 |
| 5,506,720 A | 4/1996 | Yoon ......................... 359/224 | | 5,798,805 A | 8/1998 | Ooi et al. .................... 349/10 |
| 5,508,558 A | 4/1996 | Robinette, Jr. et al. ..... 257/700 | | 5,801,074 A | 9/1998 | Kim et al. .................. 437/125 |
| 5,508,561 A | 4/1996 | Tago et al. .................. 257/737 | | 5,802,222 A | 9/1998 | Rasch et al. .................... 385/1 |
| 5,508,565 A | 4/1996 | Hatakeyama et al. ....... 257/777 | | 5,808,323 A | 9/1998 | Spaeth et al. ................. 257/88 |
| 5,508,750 A | 4/1996 | Hewlett et al. ............. 348/558 | | 5,808,797 A | 9/1998 | Bloom et al. ............... 359/572 |
| 5,508,840 A | 4/1996 | Vogel et al. ................. 359/291 | | 5,815,126 A | 9/1998 | Fan et al. ...................... 345/8 |
| 5,508,841 A | 4/1996 | Lin et al. .................... 359/318 | | 5,825,443 A | 10/1998 | Kawasaki et al. ............ 349/95 |
| 5,510,758 A | 4/1996 | Fujita et al. ................. 333/247 | | 5,835,255 A | 11/1998 | Miles ......................... 359/291 |
| 5,510,824 A | 4/1996 | Nelson ....................... 347/239 | | 5,835,256 A | 11/1998 | Huibers ...................... 359/291 |
| 5,512,374 A | 4/1996 | Wallace et al. ............. 428/422 | | 5,837,562 A | 11/1998 | Cho ............................ 438/51 |
| 5,512,748 A | 4/1996 | Hanson ....................... 250/332 | | 5,841,579 A | 11/1998 | Bloom et al. ............... 359/572 |
| 5,515,076 A | 5/1996 | Thompson et al. ......... 345/139 | | 5,844,711 A | 12/1998 | Long, Jr. .................... 359/291 |
| 5,516,125 A | 5/1996 | McKenna ...................... 279/3 | | 5,847,859 A | 12/1998 | Murata ....................... 359/201 |
| 5,517,340 A | 5/1996 | Doany et al. ................. 359/41 | | 5,862,164 A | 1/1999 | Hill ............................. 372/27 |
| 5,517,347 A | 5/1996 | Sampsell ..................... 359/224 | | 5,868,854 A | 2/1999 | Kojima et al. ............... 134/1.3 |
| 5,517,357 A | 5/1996 | Shibayama ................. 359/547 | | 5,886,675 A | 3/1999 | Aye et al. ...................... 345/7 |
| 5,517,359 A | 5/1996 | Gelbart ....................... 359/623 | | 5,892,505 A | 4/1999 | Tropper ...................... 345/208 |
| 5,519,251 A | 5/1996 | Sato et al. ................... 257/666 | | 5,895,233 A | 4/1999 | Higashi et al. ............. 438/107 |
| 5,519,450 A | 5/1996 | Urbanus et al. ............. 348/600 | | 5,898,515 A | 4/1999 | Furlani et al. ............. 359/290 |
| 5,521,748 A | 5/1996 | Sarraf ......................... 359/321 | | 5,903,243 A | 5/1999 | Jones .............................. 345/7 |
| 5,523,619 A | 6/1996 | McAllister et al. ......... 257/686 | | 5,903,395 A | 5/1999 | Rallison et al. ............. 359/630 |
| 5,523,628 A | 6/1996 | Williams et al. ............ 257/777 | | 5,904,737 A | 5/1999 | Preston et al. ................. 8/158 |
| 5,523,803 A | 6/1996 | Urbanus et al. ............. 348/771 | | 5,910,856 A | 6/1999 | Ghosh et al. ............... 359/291 |
| 5,523,878 A | 6/1996 | Wallace et al. ............. 359/290 | | 5,912,094 A | 6/1999 | Aksyuk et al. ................. 430/5 |
| 5,523,881 A | 6/1996 | Florence et al. ............ 359/561 | | 5,912,608 A | 6/1999 | Asada ......................... 335/222 |
| 5,523,920 A | 6/1996 | Machuga et al. ............ 361/767 | | 5,914,801 A | 6/1999 | Dhuler et al. ............... 359/230 |
| 5,524,155 A | 6/1996 | Weaver ........................ 385/24 | | 5,915,168 A | 6/1999 | Salatino et al. ............. 438/110 |
| 5,526,834 A | 6/1996 | Mielnik et al. .............. 134/105 | | 5,919,548 A | 7/1999 | Barron et al. .............. 428/138 |
| 5,534,107 A | 7/1996 | Gray et al. ............... 156/643.1 | | 5,920,411 A | 7/1999 | Duck et al. ................ 359/127 |
| 5,534,883 A | 7/1996 | Koh ............................ 345/3 | | 5,920,418 A | 7/1999 | Shiono et al. ............... 359/246 |
| 5,539,422 A | 7/1996 | Heacock et al. ............... 345/8 | | 5,923,475 A | 7/1999 | Kurtz et al. ................. 359/619 |
| 5,544,306 A | 8/1996 | Deering et al. ............. 395/164 | | 5,926,309 A | 7/1999 | Little ......................... 359/293 |
| 5,554,304 A | 9/1996 | Suzuki .......................... 216/2 | | 5,926,318 A | 7/1999 | Hebert ....................... 359/618 |
| 5,576,878 A | 11/1996 | Henck ........................ 359/224 | | 5,942,791 A | 8/1999 | Shorrocks et al. ........... 257/522 |
| 5,602,671 A | 2/1997 | Hornbeck .................... 359/224 | | 5,949,390 A | 9/1999 | Nomura et al. ............... 345/32 |
| 5,606,181 A | 2/1997 | Sakuma et al. ............... 257/88 | | 5,949,570 A | 9/1999 | Shiono et al. ............... 359/291 |
| 5,606,447 A | 2/1997 | Asada et al. ................. 359/199 | | 5,953,161 A | 9/1999 | Troxell et al. .............. 359/618 |
| 5,610,438 A | 3/1997 | Wallace et al. ............. 257/682 | | 5,955,771 A | 9/1999 | Kurtz et al. ................. 257/419 |
| 5,623,361 A | 4/1997 | Engle ......................... 359/291 | | 5,963,788 A | 10/1999 | Barron et al. ................. 438/48 |
| 5,629,566 A | 5/1997 | Doi et al. .................... 257/789 | | 5,978,127 A | 11/1999 | Berg .......................... 359/279 |
| 5,629,801 A | 5/1997 | Staker et al. ................. 359/572 | | 5,982,553 A | 11/1999 | Bloom et al. ............... 359/627 |
| 5,640,216 A | 6/1997 | Hasegawa et al. ............ 349/58 | | 5,986,634 A | 11/1999 | Alioshin et al. ............ 345/126 |
| 5,658,698 A | 8/1997 | Yagi et al. ..................... 430/11 | | 5,986,796 A | 11/1999 | Miles ........................ 359/260 |
| 5,661,592 A | 8/1997 | Bornstein et al. ........... 359/291 | | 5,995,303 A | 11/1999 | Honguh et al. ............. 359/708 |
| 5,661,593 A | 8/1997 | Engle ......................... 359/292 | | 5,999,319 A | 12/1999 | Castracane .................. 359/573 |
| 5,663,817 A | 9/1997 | Frapin et al. .................. 349/5 | | 6,004,912 A | 12/1999 | Gudeman ................... 508/577 |
| 5,668,611 A | 9/1997 | Ernstoff et al. ............. 348/771 | | 6,016,222 A | 1/2000 | Setani et al. ................ 359/571 |
| 5,673,139 A | 9/1997 | Johnson ...................... 359/291 | | 6,025,859 A | 2/2000 | Ide et al. .................... 347/135 |
| 5,677,783 A | 10/1997 | Bloom et al. ............... 359/224 | | 6,038,057 A | 3/2000 | Brazas, Jr. et al. .......... 359/291 |
| 5,689,361 A | 11/1997 | Damen et al. ............... 359/284 | | 6,040,748 A | 3/2000 | Gueissaz ....................... 335/78 |
| 5,691,836 A | 11/1997 | Clark ......................... 359/247 | | 6,046,840 A | 4/2000 | Huibers ...................... 359/291 |
| 5,694,740 A | 12/1997 | Martin et al. ................. 53/431 | | 6,055,090 A | 4/2000 | Miles .......................... 359/291 |
| 5,696,560 A | 12/1997 | Songer ....................... 348/436 | | 6,057,520 A | 5/2000 | Goodwin-Johansson .... 200/181 |
| 5,699,740 A | 12/1997 | Gelbart ....................... 101/477 | | 6,061,166 A | 5/2000 | Furlani et al. ............... 359/254 |
| 5,704,700 A | 1/1998 | Kappel et al. ................. 353/31 | | 6,061,489 A | 5/2000 | Ezra .......................... 385/115 |
| 5,707,160 A | 1/1998 | Bowen ........................ 400/472 | | 6,062,461 A | 5/2000 | Sparks et al. ............. 228/123.1 |
| 5,712,649 A | 1/1998 | Tosaki ........................... 345/8 | | 6,064,404 A | 5/2000 | Aras et al. ................... 345/507 |
| 5,713,652 A | 2/1998 | Zavracky et al. ............ 353/122 | | 6,069,392 A | 5/2000 | Tai et al. ..................... 257/419 |
| 5,726,480 A | 3/1998 | Pister ......................... 257/415 | | 6,071,652 A | 6/2000 | Feldman et al. ................. 430/5 |
| 5,731,802 A | 3/1998 | Aras et al. ................... 345/148 | | 6,075,632 A | 6/2000 | Braun ........................ 359/124 |
| 5,734,224 A | 3/1998 | Tagawa et al. ............... 313/493 | | 6,084,626 A | 7/2000 | Ramanujan et al. ........ 347/239 |
| 5,742,373 A | 4/1998 | Alvelda ...................... 349/204 | | 6,088,102 A | 7/2000 | Manhart ...................... 356/354 |
| 5,744,752 A | 4/1998 | McHerron et al. ......... 174/52.4 | | 6,090,717 A | 7/2000 | Powell et al. ............... 438/710 |
| 5,745,271 A | 4/1998 | Ford et al. ................... 359/130 | | 6,091,521 A | 7/2000 | Popovich ...................... 359/15 |
| 5,757,354 A | 5/1998 | Kawamura .................. 345/126 | | 6,096,576 A | 8/2000 | Corbin et al. .............. 438/108 |
| 5,757,536 A | 5/1998 | Ricco et al. ................. 359/224 | | 6,097,352 A | 8/2000 | Zavracky et al. ............. 345/7 |
| 5,764,280 A | 6/1998 | Bloom et al. ................. 348/53 | | 6,101,036 A | 8/2000 | Bloom ........................ 359/567 |
| 5,768,009 A | 6/1998 | Little ......................... 359/293 | | 6,115,168 A | 9/2000 | Zhao et al. .................. 359/247 |
| 5,773,473 A | 6/1998 | Hall et al. .................... 438/26 | | 6,122,299 A | 9/2000 | DeMars et al. ............... 372/20 |

| | | | |
|---|---|---|---|
| 6,123,985 A | 9/2000 | Robinson et al. | 427/162 |
| 6,124,145 A | 9/2000 | Stemme et al. | 438/26 |
| 6,130,770 A | 10/2000 | Bloom | 359/224 |
| 6,144,481 A | 11/2000 | Kowarz et al. | 359/291 |
| 6,147,789 A | 11/2000 | Gelbart | 359/231 |
| 6,154,259 A | 11/2000 | Hargis et al. | 348/756 |
| 6,163,026 A | 12/2000 | Bawolek et al. | 250/351 |
| 6,163,402 A | 12/2000 | Chou et al. | 359/443 |
| 6,169,624 B1 | 1/2001 | Godil et al. | 359/237 |
| 6,172,796 B1 | 1/2001 | Kowarz et al. | 359/290 |
| 6,172,797 B1 | 1/2001 | Huibers | 359/291 |
| 6,177,980 B1 | 1/2001 | Johnson | 355/67 |
| 6,181,458 B1 | 1/2001 | Brazas, Jr. et al. | 359/290 |
| 6,188,519 B1 | 2/2001 | Johnson | 359/572 |
| 6,195,196 B1 | 2/2001 | Kimura et al. | 359/295 |
| 6,197,610 B1 | 3/2001 | Toda | 438/50 |
| 6,210,988 B1 | 4/2001 | Howe et al. | 438/50 |
| 6,215,579 B1 | 4/2001 | Bloom et al. | 359/298 |
| 6,219,015 B1 | 4/2001 | Bloom et al. | 345/87 |
| 6,222,954 B1 | 4/2001 | Riza | 385/18 |
| 6,229,650 B1 | 5/2001 | Reznichenko et al. | 359/566 |
| 6,229,683 B1 | 5/2001 | Goodwin-Johansson | 361/233 |
| 6,241,143 B1 | 6/2001 | Kuroda | 228/110.1 |
| 6,251,842 B1 | 6/2001 | Gudeman | 508/577 |
| 6,252,697 B1 | 6/2001 | Hawkins et al. | 359/290 |
| 6,254,792 B1 | 7/2001 | Van Buskirk et al. | 216/13 |
| 6,261,494 B1 | 7/2001 | Zavracky et al. | 264/104 |
| 6,268,952 B1 | 7/2001 | Godil et al. | 359/291 |
| 6,271,145 B1 | 8/2001 | Toda | 438/706 |
| 6,271,808 B1 | 8/2001 | Corbin | 345/7 |
| 6,274,469 B1 | 8/2001 | Yu | 438/592 |
| 6,286,231 B1 | 9/2001 | Bergman et al. | 34/410 |
| 6,290,859 B1 | 9/2001 | Fleming et al. | 216/2 |
| 6,290,864 B1 | 9/2001 | Patel et al. | 216/79 |
| 6,300,148 B1 | 10/2001 | Birdsley et al. | 438/15 |
| 6,303,986 B1 | 10/2001 | Shook | 257/680 |
| 6,310,018 B1 | 10/2001 | Behr et al. | 510/175 |
| 6,323,984 B1 | 11/2001 | Trisnadi | 359/245 |
| 6,327,071 B1 | 12/2001 | Kimura | 359/291 |
| 6,342,960 B1 | 1/2002 | McCullough | 359/124 |
| 6,356,577 B1 | 3/2002 | Miller | 372/107 |
| 6,356,689 B1 | 3/2002 | Greywall | 385/52 |
| 6,359,333 B1 | 3/2002 | Wood et al. | 257/704 |
| 6,384,959 B1 | 5/2002 | Furlani et al. | 359/291 |
| 6,387,723 B1 | 5/2002 | Payne et al. | 438/48 |
| 6,392,309 B1 | 5/2002 | Wataya et al. | 257/796 |
| 6,396,789 B1 | 5/2002 | Guerra et al. | 369/112 |
| 6,421,179 B1 | 7/2002 | Gutin et al. | 359/572 |
| 6,445,502 B1 | 9/2002 | Islam et al. | 359/571 |
| 6,452,260 B1 | 9/2002 | Corbin et al. | 257/686 |
| 6,466,354 B1 | 10/2002 | Gudeman | 359/247 |
| 6,480,634 B1 | 11/2002 | Corrigan | 385/4 |
| 6,497,490 B1 | 12/2002 | Miller et al. | 359/614 |
| 6,525,863 B1 | 2/2003 | Riza | 359/290 |
| 6,563,974 B2 | 5/2003 | Riza | 385/18 |
| 6,565,222 B1 | 5/2003 | Ishii et al. | 359/883 |
| 2001/0019454 A1 | 9/2001 | Tadic-Galeb et al. | 359/649 |
| 2002/0015230 A1 | 2/2002 | Pilossof et al. | 359/558 |
| 2002/0021485 A1 | 2/2002 | Pilossof | 359/295 |
| 2002/0079432 A1 | 6/2002 | Lee et al. | 250/216 |
| 2002/0105725 A1 | 8/2002 | Sweatt et al. | 359/566 |
| 2002/0112746 A1 | 8/2002 | DeYoung et al. | 134/36 |
| 2002/0131230 A1 | 9/2002 | Potter | 361/277 |

OTHER PUBLICATIONS

"Micromachined Opto/Electro/Mechanical Systems," Electronic Systems, NASA Tech Briefs, Mar. 1997, pp. 50 & 52.

David M. Burns et al., "Development of Microelectromechanical Variable Blaze Gratings," Sensors and Actuators A 64 (1998), pp. 7–15.

Apte et al., "Deformable Grating Light Valves for High Resolution Displays," Solid State Actuator Workshop, Hilton Head, South Carolina, Jun. 13–16, 1994.

Sene et al., "Polysilicon micromechanical gratings for optical modulation," Sensors and Actuators, vol. A57, pp. 145–151, 1996.

Amm et al., "Invited Paper: Grating Light Valve™ Technology: Update and Novel Applications," SID Digest, vol. 29, 1998.

Solgaard, O., *Integrated semiconductor light modulators for fiber–optic and display applications*, Ph.D. Dissertation, Stanford University, Feb. 1992.

Apte, R.B., *Grating light valves for high resolution displays*, Ph.D. Dissertation, Stanford University, Jun. 1994.

Burns, D.M. et al., *Development of microelectromechanical variable blaze gratings*, Sensors and Actuators A, pp. 7–15, 1998.

* cited by examiner

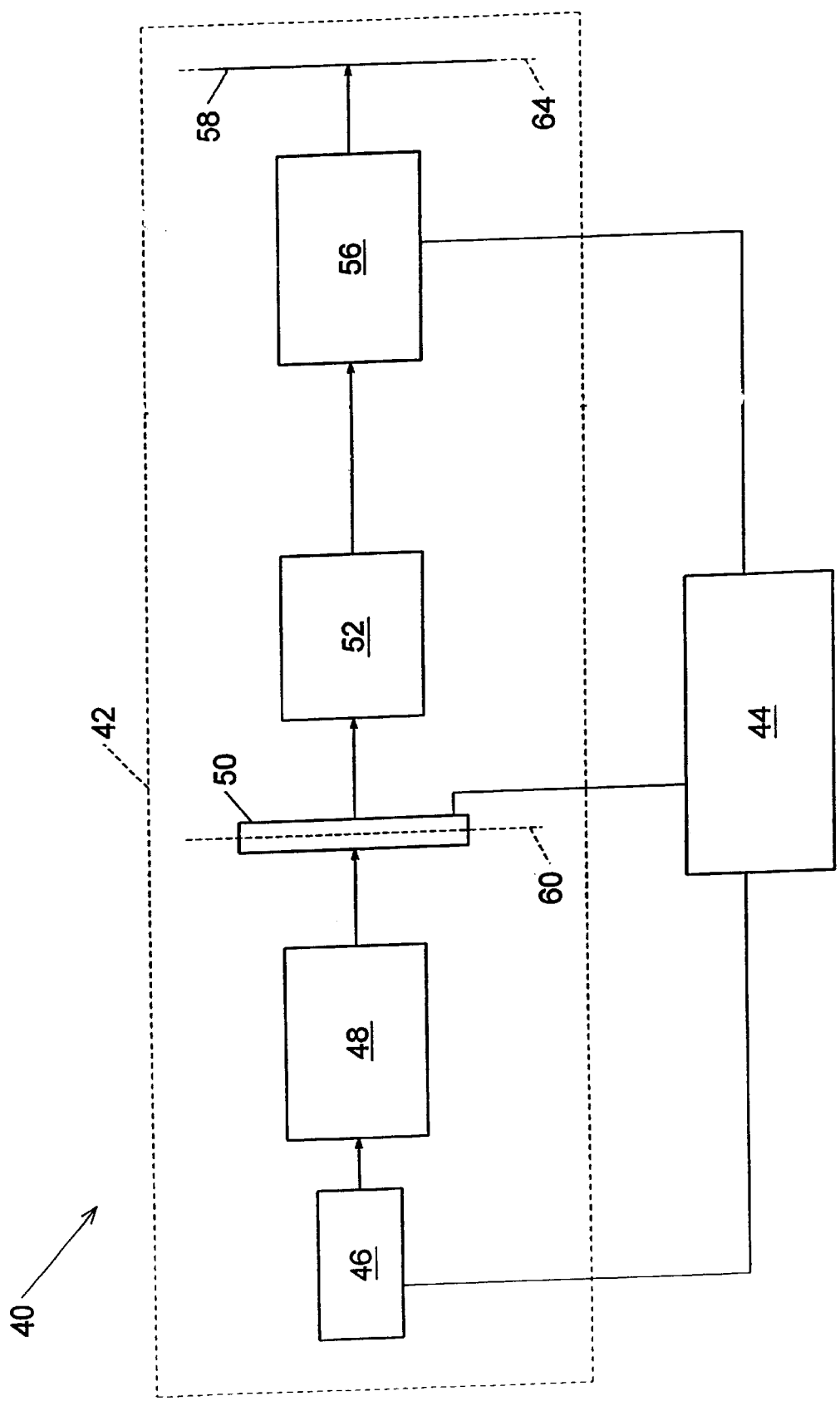

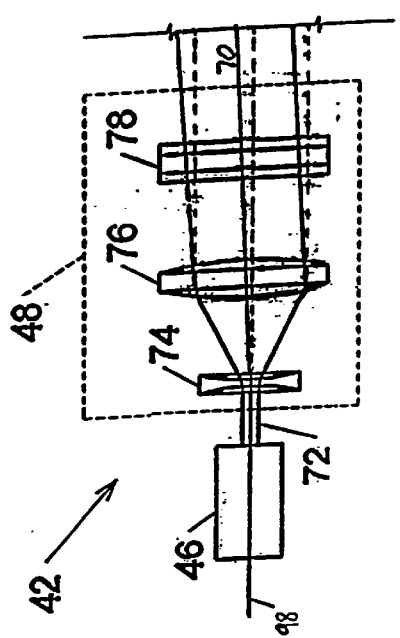
FIG. 6A
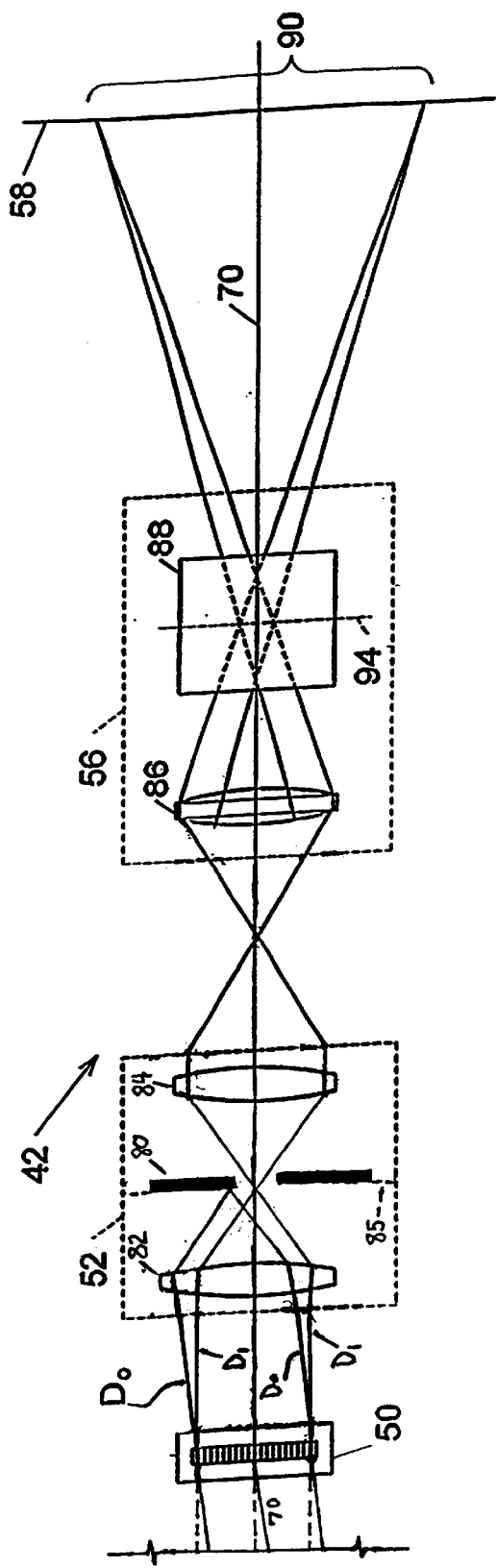
FIG. 6B
| FIG. 6A | FIG. 6B |
FIG. 6

ANGLED ILLUMINATION FOR A SINGLE ORDER LIGHT MODULATOR BASED PROJECTION SYSTEM

RELATED APPLICATIONS

This Patent Application is a continuation-in-part of U.S. patent application Ser. No. 09/832,672, filed on Apr. 10, 2001 and is hereby incorporated by reference in its entirety.

FIELD OF THE INVENTION

This invention relates to the field of image projectors. More particularly, this invention relates to the field of angled illumination for a single order grating light valve based projection system.

BACKGROUND OF THE INVENTION

In recent years, light modulators have been developed using MEMS (micro-electro-mechanical systems) technology in which moveable elements are configurable to direct light. An example of such light modulators is a grating light valve type device (GLV type device) taught in U.S. Pat. No. 5,311,360 to Bloom et al., in which the GLV type device is configurable in a reflecting mode and a diffracting mode. The GLV type device taught by Bloom et al. is isometrically illustrated in FIG. 1. The GLV type device 10 includes moveable elongated elements 12 suspended over a substrate 14.

A first side view of the GLV type device 10 of the prior art is illustrated in FIG. 2A, which shows the GLV type device 10 in the reflecting mode. The moveable elongated elements 12 each include a first reflective coating 16. Interspersed between the moveable elongated elements 12 are second reflective coatings 18. In the reflecting mode, upper surfaces of the first and second reflective coatings, 16 and 18, are separated by a height difference of a half wavelength $\lambda/2$ of incident light I. The incident light I reflecting from the second reflecting coatings 18 travels a full wavelength further than the incident light I reflecting form the first reflecting coatings 16. So the incident light I, reflecting from the first and second reflecting coatings, 16 and 18, constructively combines to form reflected light R. Thus, in the reflecting mode, the GLV type device 10 produces the reflected light R.

A second side view of the GLV type device 10 of the prior art is illustrated in FIG. 2B, which shows the GLV type device in the diffracting mode. To transition from the reflecting mode to the diffracting mode, an electrostatic potential between the moveable elongated elements 12 and the substrate 14 moves the moveable elongated elements 12 to contact the substrate 14. To maintain the diffracting mode, the electrostatic potential holds the moveable elongated elements 12 against the substrate 14. In the diffracting mode, the upper surfaces of the first and second reflective coatings, 16 and 18, are separated by a quarter wavelength $\lambda/4$ of the incident light I. The incident light I reflecting from the second reflecting surfaces 18 travels a half wavelength further than the incident light I reflecting from the first reflective coatings 16. So the incident light I, reflecting from the first and second reflecting coatings, 16 and 18, destructively interferes to produce diffraction. The diffraction includes a plus one diffraction order $D_{+1}$ and a minus one diffraction order $D_{-1}$. Thus, in the diffracting mode, the GLV type device 10 produces the plus one and minus one diffraction orders, $D_{+1}$ and $D_{-1}$.

A first alternative GLV type device of the prior art is illustrated in FIGS. 3A and 3B. The first alternative GLV type device 10A includes first elongated elements 22 interdigitated with second elongated elements 23. The first elongated elements 22 include third reflective coatings 26; the second elongated elements 23 include fourth reflective coating 28. In the reflecting mode, illustrated in FIG. 3A, the third and fourth reflective coatings, 26 and 28, are maintained at the same height to produce the reflected light R. In the diffracting mode, illustrated in FIG. 3B, the first and second reflected coatings, 26 and 28, are separated by the second height difference of the quarter wavelength $\lambda/4$ of the incident light I to produce the diffraction including the plus one and minus one diffraction orders, $D_{+1}$ and $D_{-1}$.

A display system utilizing a GLV type device is taught in U.S. Pat. No. 5,982,553 to Bloom et al. The display system includes red, green, and blue lasers, a dichroic filter group, illumination optics, the GLV type device, Schlieren optics, projection optics, a scanning mirror, and display electronics, which project a color image onto a display screen. The red, green, and blue lasers, driven by the display electronics and coupled to the GLV type device (via the dichroic filter group and the illumination optics) sequentially illuminate the GLV type device with red, green, and blue illuminations. The GLV type device, driven by the display electronics, produces a linear array of pixels which changes with time in response to a signal from the display electronics, each pixel configured in the reflecting mode or the diffracting mode at a given instant in time. Thus, the GLV type device produces sequential linear arrays of red, green, and blue pixels with each of the red, green, and blue pixels in the reflecting mode or the diffracting mode.

The red, green, and blue pixels are then coupled to the Schlieren optics which blocks the reflecting mode and allows at least the plus one and minus one diffraction order, $D_{+1}$ and $D_{-1}$, to pass the Schlieren optics. Thus, after passing the Schlieren optics, the linear arrays of the red, green, and blue pixels have light pixels corresponding to the pixels at the GLV type device in the diffracting mode and dark pixels corresponding to pixels at the GLV type device in the reflecting mode. The projection optics (via the scanning mirror) project the linear arrays of the red, green, and blue pixels onto the display screen while the scanning mirror, driven by the display electronics, scans the linear arrays of the red, green, and blue pixels across the display screen. Thus, the display system produces a two dimensional color image on the display screen.

An alternative display system utilizing the GLV type device includes the red, green, and blue lasers; red, green, and blue illumination optics; first, second, and third GLV type devices; the dichroic filter group; the projection optics; the scanning mirror; and the display electronics. The red, green, and blue lasers, via the red, green, and blue illumination optics, illuminate the first, second, and third GLV type devices, respectively. The first, second, and third GLV type devices produce the linear arrays of the red, green, and blue pixels, respectively, in response to signals from the display electronics. The dichroic filter group directs the light from the linear arrays of the red, green, and blue pixels to the Schlieren optics, which allows at least the plus one and minus one diffraction order, $D_{+1}$ and $D_{-1}$, to pass the Schlieren optics. The projection optics, via the scanning mirror, project the linear arrays of the red, green, and blue pixels onto the display screen while the scanning mirror, driven by the display electronics, scans the linear arrays of the red, green, and blue pixels across the display screen. Thus, the alternative display system produces the two dimensional color image on the display screen.

Examples of applications for a GLV type device base display system include a home entertainment system, a boardroom application, and a cinema application among others. In the home entertainment system or the boardroom application, the GLV type device based display system projects the two dimensional color image onto the display screen located on a wall. In the cinema application, the GLV type device based display system projects the two dimensional color image from a display booth onto a cinema screen.

A GLV type device based display may also be utilized in printing applications. In such a case, the system would not include a scanning mirror, and the printing media, replacing a screen, would move to effectuate printing from a fixed line of light.

The aforementioned GLV type device based display systems put light in the ±1 diffraction orders. Theoretically, when light is filtered into two diffraction orders, the maximum amount of light that can be transmitted or reflected is equal to only 81% of the incident light beam. Another problem encountered in this type of system is the need for a more complex separating optics configuration or Schlieren optics. In such a system that filters light into two separate diffraction orders, a separating optical system must have two slits to receive the two orders. This configuration requires a complicated set of separating optics to properly separate the two orders.

Yet another disadvantage to implementing a GLV type device based system such as this is the requirement of the GLV type device producing a wide cone of light. In a system that produces light in the ±1 diffraction orders, all of the optics between the GLV type device and the projection screen must have a low F number in order to collect a large amount of light. This means that the optics must have a high optical throughput, thus requiring a larger lens. This larger lens captures more light, including additional background light, thus producing an image with a lower contrast, thus a less clear picture. Additionally, a larger lens means greater expense.

What is needed is a display system that implements a diffracted light modulator that puts light in a single diffraction order while providing a higher contrast. This system would allow a larger percentage of the incident light to be put in a diffraction order. A light modulator utilizing only one diffraction order would also allow for a less complex and expensive separating optics configuration. Additionally, utilizing such a light modulator would eliminate the need for all of the optics to have a low F number and high optical throughput, thereby reducing the cost of the entire system.

SUMMARY OF THE INVENTION

The present invention is a display apparatus and method for providing angled illumination for a single order grating light valve projection system. The display apparatus and method includes a light modulator being optically coupled to illumination optics such that in operation the illumination optics illuminate the light modulator with an off-axis illumination and further such that in operation the light modulator directs light onto an optic axis for a bright pixel, thereby forming on-axis light. Further, the light modulator directs the light away from the optic axis for a dark pixel, thereby forming off-axis light.

The display apparatus and method for providing angled illumination for a single order grating light valve projection system also includes separating optics that are optically coupled to the light modulator such that in operation they separate the off-axis light from the on-axis light, where the on-axis light produces a two dimensional image that is in the preferred embodiment a real image. Alternatively, the two dimensional image is a virtual image.

Lastly, the apparatus and method includes projection and scanning optics that are optically coupled to the separating optics.

BRIEF DESCRIPTION OF THE DRAWINGS

FIG. 4 schematically illustrates a display apparatus of the present invention.

FIGS. 6A and 6B illustrates an elevation view of the display optics of the present invention with the display optics unfolded along an optical axis.

DETAILED DESCRIPTION OF THE PREFERRED EMBODIMENT

Figure 1:
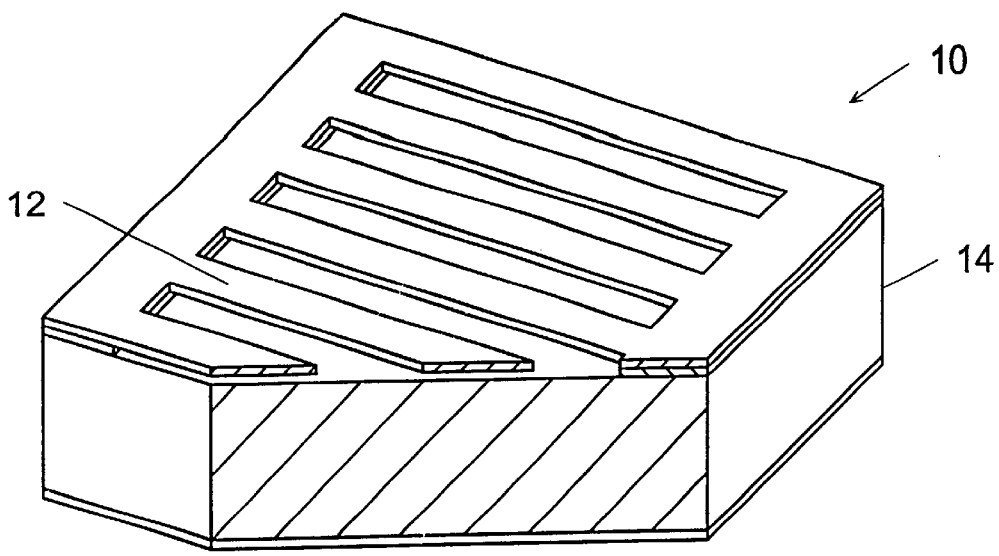
FIG. 1 illustrates an isometric view of a conventional grating light valve type device (GLV type device)
Figure 2A:
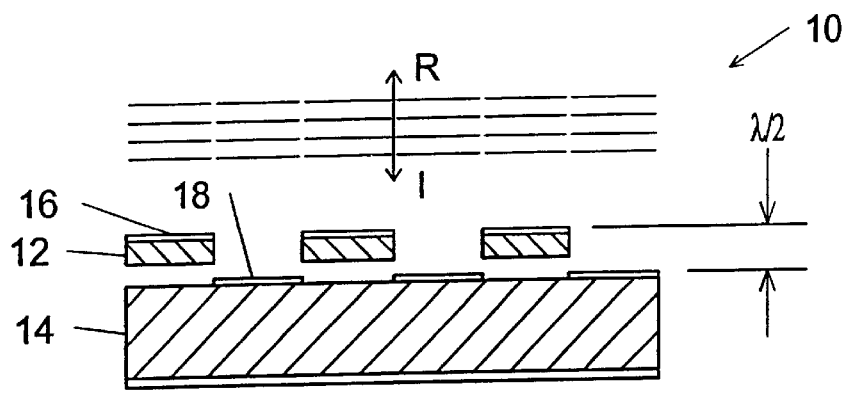
FIGS. 2A and B illustrates a side view of the conventional GLV type device.
Figure 2B:
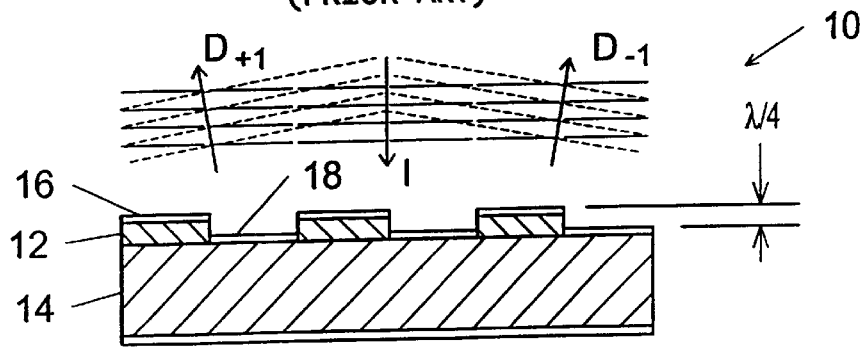
Figure 3A:
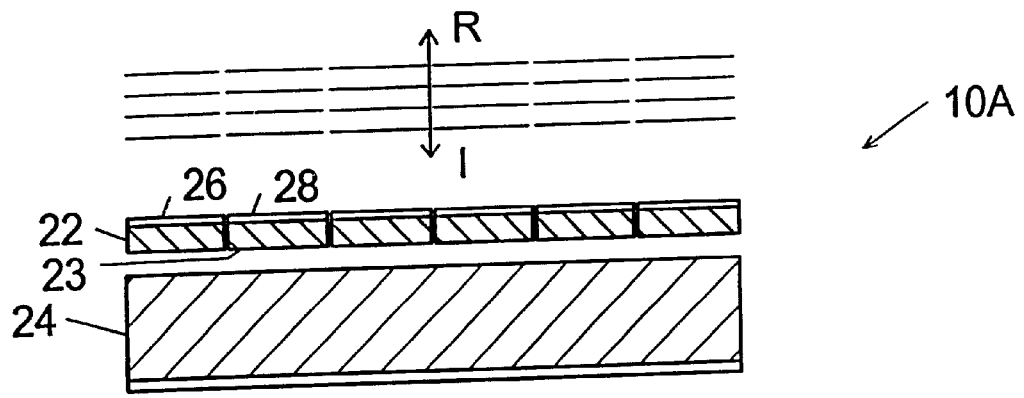
FIGS. 3A and B illustrates a side view of an alternative conventional GLV type device.
Figure 3B:
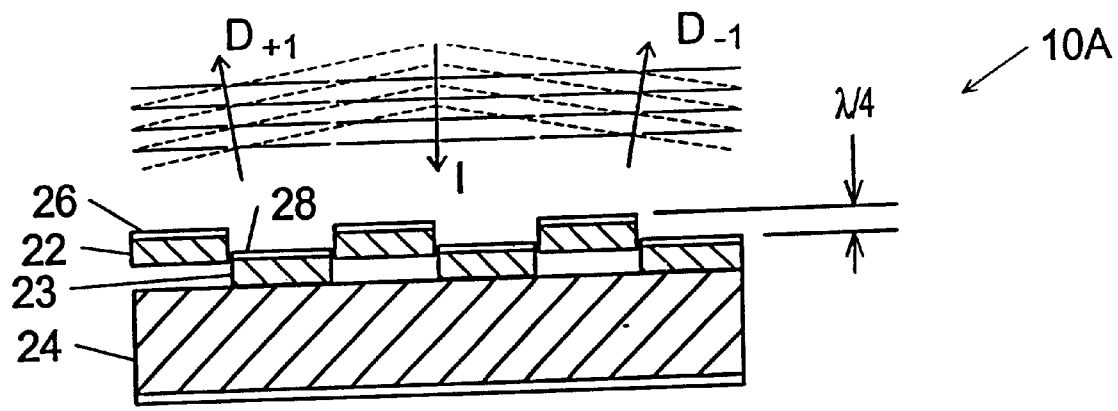

A display system of the present invention is illustrated schematically in FIG. 4. The display system 40 includes display optics 42 and display electronics 44. The display optics 42 comprise a laser 46, illumination optics 48, a blazed grating light valve (BGLV) 50, separating optics 52, projection and scanning optics 56, and a display screen 58. The display electronics 44 are coupled to the laser source 46, the BGLV 50, and the projection and scanning optics 56.

The details concerning the BGLV 50 are disclosed in a co-owned, co-filed, co-pending U.S. patent application, Ser. No. 09/930,838, entitled BLAZED GRATING LIGHT VALVE, and co-owned, co-filed, co-pending U.S. patent application, Ser. No. 09/930,820, entitled STRESS TUNED BLAZED GRATING LIGHT VALVE. The U.S. patent application Ser. No. 09/930,838, entitled BLAZED GRATING LIGHT VALVE, and U.S. patent application Ser. No. 09/930,820, entitled STRESS TUNED BLAZED GRATING LIGHT VALVE are also incorporated by reference.

The display electronics 44 power the laser 46. The laser 46 emits a laser illumination. The illumination optics 48 focus the laser illumination onto the BGLV 50. The BGLV 50 is located in a first image plane 60. The display electronics 44 control the BGLV 50. The BGLV 50 modulates the laser illumination forming reflected light or diffracted light for a linear array of pixels. The separating optics 52 separates the reflected light from the diffracted light allowing at least an active first diffraction order to pass the separating optics 52.

The display electronics 44 drive a scanning mirror of the projection and scanning optics 56. The projection and scanning optics 56 project the line image onto the display screen 58 and scan the line image across the display screen 58 to form a two dimensional image on the display screen 58. The display screen 58 is located in a third image plane 64.

Figure 5:
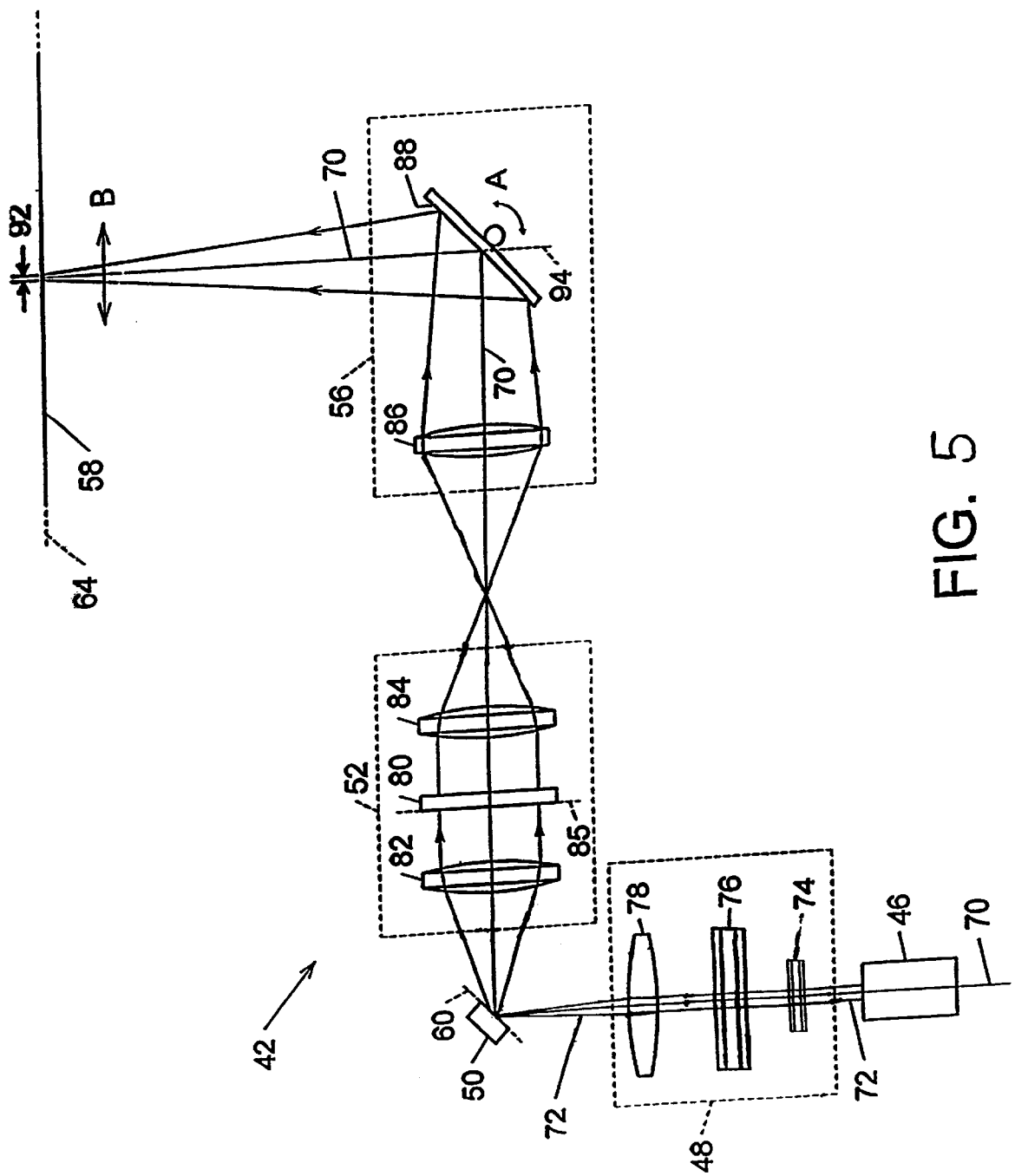
FIG. 5 illustrates an plan view of display optics of the present invention.

The display optics 42 of the present invention are further illustrated in FIGS. 5 and 6. FIG. 5 illustrates a plan view of the display optics 42. FIG. 6 illustrates an elevation view of the display optics 42, with the display optics 42 unfolded along an optic axis 70. The laser 46 emits the laser illumination 72 on axis 98. The illumination optics comprise a line generating lens or Powell lens 74, a collimation lens 76, and a cylindrical lens 78. The collimation lens 76 is translated so that upon leaving the illumination optics 48, the light beam is tilted away from the optical axis 70. This variable illumination angle is achieved by translating the collimation lens 76 by a different amount for each color illumination. The desired angle for each color is shown here for a 12.75 micron grating pitch:

| Wavelength (nm) | Diffraction/Illumination Angle |
|---|---|
| Red 620 nm | 2.8° |
| Green 532 nm | 2.4° |
| Blue 457 nm | 2.05° |

It will be readily apparent to one skilled in the art that the Diffraction/Illumination Angle may differ according to the grating pitch.

The illumination optics 48 focus the laser illumination 72 onto the BGLV 50 in a focus line having a focus width. Note that FIG. 5 illustrates the laser illumination 72 illuminating the BGLV 50 with an angle of incidence of 45°. Ideally, the angle of incidence is a minimum angle of incidence which allows the laser illumination 72 to illuminate the BGLV 50 while allowing the reflected and diffracted light to reach the separating optics 52. It will be readily apparent to one skilled in the art that other optics arrangements can be used to illuminate the BGLV 50. It will also be readily apparent to one skilled in the art that depiction of lenses in the present invention is not limited to single component lenses and that any given lens can be replaced with a compound lens or a reflective optical element.

The BGLV 50 modulates the laser illumination 72 as the linear array of pixels along the focus line, forming the reflected light $D_0$ or the diffracted light, including the active first diffraction order $D_1$ for each pixel. Preferably, the BGLV 50 produces a linear array of 1,080 pixels. Alternatively, the BGLV 50 produces more or less than 1,080 pixels. Note that FIG. 6 illustrates the reflected light $D_0$ and the active first diffraction order $D_1$ for two pixels for illustration purposes. If a given pixel is modulated to reflect light, the reflected light $D_0$ will be present and the active first diffraction order $D_1$ will not be present. Alternatively, if the given pixel is modulated to diffract light, the active first diffraction order $D_1$ will be present and the reflected light $D_0$ will not be present. In some instances it is desirable to modulate the given pixel to produce the reflected light $D_0$ and the active first diffraction order $D_1$ in order to reduce a brightness of the given pixel in a resulting image, which provides a gray scale effect in the resulting image. It will be readily apparent to one skilled in the art that an alternate light modulator which places light off-axis in a first state and on-axis in a second can replace the BGLV 50 of the present invention.

Referring again to FIG. 5, the Schlieren optics 52 include a Schlieren stop 80 located between first and second relay lenses, 82 and 84. The Schlieren stop 80 stops the reflected light R and allows the active first diffraction order $D_1$ to pass the Schlieren stop 80. The Schlieren stop 80 is preferably located in a first transform plane 85. Alternatively, the Schlieren stop 80 is located near the first transform plane 85.

The projection and scanning optics 56 comprise a projection lens 86 and the scanning mirror 88. The projection lens 86, via the scanning mirror 88, projects the line image 90 onto the display screen 58. The projection lens 86 also reforms the wavefront having the spatial phase variation across the line image width 92 on the display screen 58. The scanning mirror 88 is preferably located at about a second transform plane 94.

The scanning mirror 88 moves with a first scan motion A and, thus, scans the line image 90 across the display screen 58 with a second scan motion B. Preferably, the first scan motion A is a sawtooth scan motion where a first part of a scan cycle illuminates the display screen 58 and a second part of the scan cycle returns the scanning mirror 88 back to a beginning of the scan cycle. By repeatedly scanning the line image 90 across the display screen 58, a two dimensional image is formed on the display screen 58. It will be readily apparent to one skilled in the art that other scan motions can be used to scan the line image 90 across the display screen 58. It will also be readily apparent to one skilled in the art that a transmissive scanning device such as an objective scanner having zero optical power can replace the scanning mirror 88.

As the line image 90 scans across the display screen 58, the BGLV 50 modulates the linear array of pixels thus producing the two dimensional image made up of a rectangular array of pixels. For a high definition television (HDTV) format, the BGLV 50 modulates 1,920 times as the line image 90 scans across the display screen 58. Thus, the BGLV 50 preferably produces a 1,920 by 1,080 rectangular array forming the two dimensional image for the HDTV format. For other picture formats, the BGLV 50 modulates more or less than the 1,920 times as the line image 90 scans across the display 25 screen 58 depending upon which of the other picture formats is being displayed.

As the line image width 92 scans across the display screen 58, the wavefront having the spatial phase variation produces the multiple speckle patterns with time. The multiple speckle patterns reduce the speckle that is detected by the eye or the intensity detector of the optical system.

The display optics 42 depicted in FIGS. 4, 5, and 6 produce a monochrome image. Color display optics comprise the display optics 42, two additional lasers, two additional illumination optics, two additional BGLV's, and a dichroic filter group. In the color display optics, red, green, and blue lasers illuminate the three BGLV's producing red, green, and blue linear arrays of pixels. The dichroic filter group combines the reflected and diffracted light from the three BGLV's and directs the reflected and diffracted light to the separating optics 52. For the color display optics, the spatial phase variation across the line image width 92 preferably has an optimum amplitude for one of red, green, and blue laser illuminations (e.g., the green laser illumination), or a wavelength that is a specific average of participating wavelengths. The red, green, and blue wavefronts produce the multiple speckle patterns over time as the line image 90 is scanned across the display screen 58 and, thus, reduce the speckle in the color display optics.

One advantage of the angled illumination is apparent in the projection optics. A single beam having all three colors on-axis requires a smaller lens, thus allowing less stray into the system. This provides the image with higher contrast yielding an overall clearer picture. Another advantage is that, because all three colors go through the same path in the projection optics, the design is simpler permitting the use of "off-the-shelf" optics as opposed to specially designed optical pieces. Further, this particular technique of varying the angle of the illumination is flexible, variable and consistent with good manufacturing and alignment practices.

One modification to the preferred embodiment may include, but is not limited to, implementing a standard GLV type device rather than a blazed type. This modification can be implemented if throughput is not an issue, as in some printing applications. In which case, one of the diffraction orders would simply be ignored. Additionally, the technique in the preferred embodiment is also applicable to monochrome systems, since the single color would still be on-axis for the projection system.

It will be readily apparent to one skilled in the art that other various modifications may be made to the preferred embodiment without departing from the spirit and scope of the invention as defined by the appended claims.

I claim:

1. A display apparatus comprising:
   a. illumination optics;
   b. a light modulator optically coupled to the illumination optics such that in operation the illumination optics illuminate the light modulator with an off-axis illumination and the light modulator selectively directs the off-axis illumination onto an optic axis, thereby forming on-axis light;
   c. separating optics optically coupled to the light modulator; and
   d. projecting and scanning optics optically coupled to the separating optics.

2. The display apparatus as claimed in claim 1 wherein the light modulator is further coupled to the illumination optics such that in operation the light modulator directs light onto the optic axis for a bright pixel, thereby forming the on-axis light.

3. The display apparatus as claimed in claim 1 wherein the light modulator is further coupled to the illumination optics such that in operation the light modulator directs the light away from the optic axis for a dark pixel, thereby forming off-axis light.

4. The display apparatus as claimed in claim 1 wherein the separating optics are coupled to the light modulator such that in operation the separating optics separate the off-axis light from the on-axis light.

5. The display apparatus as claimed in claim 1 wherein the separating optics are further coupled to the light modulator such that in operation the on-axis light produces a two dimensional image.

6. The display apparatus as claimed in claim 5 wherein the two dimensional image is a real image.

7. The display apparatus as claimed in claim 5 wherein the two dimensional image is a virtual image.

8. A method of providing angled illumination for a single order grating light valve projection system comprising:
   a. illuminating a light modulator with illuminating optics such that in operation the illumination optics illuminate the light modulator with an off-axis illumination and the light modulator selectively directs the off-axis illumination onto an optic axis, thereby forming on-axis light;
   b. coupling separating optics to the light modulator optically; and
   c. coupling projection and scanning optics to the separating optics optically.

9. The method as claimed in claim 8 further comprising coupling the light modulator to the illumination optics such that in operation the light modulator directs light onto the optic axis for a bright pixel, thereby forming the on-axis light.

10. The method as claimed in claim 8 further comprising coupling the light modulator to the illumination optics such that in operation the light modulator directs the light away from the optics axis for a dark pixel, thereby forming off-axis light.

11. The method as claimed in claim 8 further comprising coupling the separating optics to the light modulator such that in operation the separating optics separate the off-axis light from the on-axis light.

12. The method as claimed in claim 8 further comprising coupling the separating optics to the light modulator such that in operation the on axis light produces a two dimensional image.

13. The method as claimed in claim 12 further comprising the two dimensional image being a real image.

14. The method as claimed in claim 12 further comprising the two dimensional image being a virtual image.

15. A display system comprising:
   a. means for illuminating;
   b. means for modulating light optically coupled to the means for illuminating such that in operation the means for illuminating illuminates the means for modulating with an off-axis illumination and the means for modulating selectively directs the off-axis illumination onto an optic axis, thereby forming on-axis light;
   c. means for separating optically coupled to the means for modulating; and
   d. means for projecting and scanning optically coupled to the means for separating.

16. The display apparatus as claimed in claim 15 wherein the means for modulating is further coupled to the means for illuminating such that in operation the means for modulating directs light onto the optic axis for a bright pixel, thereby forming the on-axis light.

17. The display apparatus as claimed in claim 15 wherein the means for modulating is further coupled to the means for illuminating such that in operation the means for modulating directs the light away from the optic axis for a dark pixel, thereby forming off-axis light.

18. The display apparatus as claimed in claim 15 wherein the means for separating is coupled to the means for modulating such that in operation the means for separating separates the off-axis light from the on-axis light.

19. The display apparatus as claimed in claim 15 wherein the means for separating is further coupled to the means for modulating such that in operation the on-axis light produces a two dimensional image.

20. The display apparatus as claimed in claim 19 wherein the two dimensional image is a real image.

21. The display apparatus as claimed in claim 19 wherein the two dimensional image is a virtual image.

22. A display apparatus for providing angled illumination for a single order grating light valve projection system comprising:
   a. a light modulator configured to receive off-axis illumination and to direct light onto an optic axis for a bright pixel, thereby forming on-axis light, and the light modulator directs the light away from the optic axis for a dark pixel, thereby forming off-axis light;
   b. separating optics optically coupled to the light modulator such that in operation the separating optics separate the off-axis light from the on-axis light and further such that in operation the on-axis light produces a two dimensional image; and
   c. projection and scanning optics optically coupled to receive the on-axis light from the separating optics.

23. The display apparatus as claimed in claim 22 wherein the two dimensional image is a real image.

24. The display apparatus as claimed in claim 22 wherein the two dimensional image is a virtual image.

25. A display apparatus comprising:
   a. a light modulator configured to receive illumination from an off-axis illumination; and
   b. separating optics optically coupled to the light modulator for receiving an on-axis diffraction from the light modulator.

26. The display apparatus as claimed in claim 25 wherein the light modulator is further coupled to illumination optics such that in operation the light modulator directs light onto an optic axis for a bright pixel, thereby forming on-axis light.

27. The display apparatus as claimed in claim 25 wherein the light modulator is further coupled to the illumination optics such that in operation the light modulator directs the light away from the optic axis for a dark pixel, thereby forming off-axis light.

28. The display apparatus as claimed in claim 25 wherein the separating optics are coupled to the light modulator such that in operation the separating optics separate the off-axis light from the on-axis light.

29. The display apparatus as claimed in claim 25 wherein the separating optics are further coupled to the light modulator such that in operation the on-axis light produces a two dimensional image.

30. The display apparatus as claimed in claim 29 wherein the two dimensional image is a real image.

31. The display apparatus as claimed in claim 29 wherein the two dimensional image is a virtual image.

32. A light valve comprising:
   a. illumination optics;
   b. a light modulator optically coupled to the illumination optics such that in operation the illumination optics illuminate the light modulator with an off-axis illumination and the light modulator selectively directs the off-axis illumination onto an optic axis, thereby forming on-axis light; and
   c. separating optics optically coupled to the light modulator.

33. The light valve as claimed in claim 32 wherein the light modulator is further coupled to the illumination optics such that in operation the light modulator directs light onto the optic axis for a bright pixel, thereby forming the on-axis light.

34. The light valve as claimed in claim 32 wherein the light modulator is further coupled to the illumination optics such that in operation the light modulator directs the light away from the optic axis for a dark pixel, thereby forming off-axis light.

35. The light valve as claimed in claim 32 wherein the separating optics are coupled to the light modulator such that in operation the separating optics separate the off-axis light from the on-axis light.

36. The light valve as claimed in claim 32 wherein the separating optics are further coupled to the light modulator such that in operation the on-axis light produces a two dimensional image.

37. The light valve as claimed in claim 36 wherein the two dimensional image is a real image.

38. The light valve as claimed in claim 36 wherein the two dimensional image is a virtual image.

* * * * *

UNITED STATES PATENT AND TRADEMARK OFFICE
CERTIFICATE OF CORRECTION

PATENT NO.    : 6,707,591 B2
DATED         : March 16, 2004
INVENTOR(S)   : David T. Amm It is certified that error appears in the above-identified patent and that said Letters Patent is hereby corrected as shown below:

Title page,
Item [56], References Cited, add the following:

| | | | | |
|---|---|---|---|---|
| --5,079,544 | 01/07/92 | DeMond et al. 340 | 701 | |
| 5,081,617 | 01/14/92 | Gelbart 369 | 112 | |
| 5,083,857 | 01/28/92 | Hornbeck 359 | 291 | |
| 5,085,497 | 02/04/92 | Um et al. 359 | 848 | |
| 5,089,903 | 02/18/92 | Kuwayama et al. 359 | 15 | |
| 5,093,281 | 03/03/92 | Eshima 437 | 217 | |
| 5,096,279 | 03/17/92 | Hornbeck et al. 359 | 230 | |
| 5,099,353 | 03/24/92 | Hornbeck 359 | 291 | |
| 5,101,184 | 03/31/92 | Antes 235 | 454 | |
| 5,101,236 | 03/31/92 | Nelson et al. 355 | 229 | |
| 5,103,334 | 04/07/92 | Swanberg 359 | 197 | |
| 5,105,207 | 04/14/92 | Nelson 346 | 160 | |
| 5,105,299 | 04/14/92 | Anderson et al. 359 | 223 | |
| 5,105,369 | 04/14/92 | Nelson 364 | 525 | |
| 5,107,372 | 04/21/92 | Gelbart et al. 359 | 824 | |
| 5,112,436 | 05/12/92 | Bol 156 | 643 | |
| 5,113,272 | 05/12/92 | Reamey 359 | 53 | |
| 5,113,285 | 05/12/92 | Franklin et al. 359 | 465 | |
| 5,115,344 | 05/19/92 | Jaskie 359 | 573 | |
| 5,119,204 | 06/02/92 | Hashimoto et al. 358 | 254 | |
| 5,121,343 | 06/09/92 | Faris 395 | 111 | |
| 5,126,812 | 06/30/92 | Greiff 357 | 25 | |
| 5,126,826 | 06/30/92 | Kauchi et al. 357 | 72 | |
| 5,126,836 | 06/30/92 | Um 358 | 60 | |
| 5,128,660 | 07/07/92 | DeMond et al. 340 | 707 | |

UNITED STATES PATENT AND TRADEMARK OFFICE
CERTIFICATE OF CORRECTION

PATENT NO.    : 6,707,591 B2
DATED         : March 16, 2004
INVENTOR(S)   : David T. Amm It is certified that error appears in the above-identified patent and that said Letters Patent is hereby corrected as shown below:

Title page,
Item [56], References Cited, add the following:

| | | | | |
|---|---|---|---|---|
| 5,129,716 | 07/14/92 | Holakovszky et al. | 351 | 50 |
| 5,132,723 | 07/21/92 | Gelbart      355 | 40 | |
| 5,132,812 | 07/21/92 | Takahashi et al. | 359 | 09 |
| 5,136,695 | 08/04/92 | Goldshlag et al. | 395 | 275 |
| 5,137,836 | 08/11/92 | Lam   437   8 | | |
| 5,142,303 | 08/25/92 | Nelson       346 | 108 | |
| 5,142,405 | 08/25/92 | Hornbeck     359 | 226 | |
| 5,142,677 | 08/25/92 | Ehlig et al. 395 | 650 | |
| 5,144,472 | 09/01/92 | Sang, Jr. et al. 359 | 254 | |
| 5,147,815 | 09/15/92 | Casto   437   51 | | |
| 5,148,157 | 09/15/92 | Florence     340 | 783 | |
| 5,148,506 | 09/15/92 | McDonald     385 | 16 | |
| 5,149,405 | 09/22/92 | Bruns et al. 204 | 129.1 | |
| 5,150,205 | 09/22/92 | Um et al.    358 | 60 | |
| 5,151,718 | 09/29/92 | Nelson       346 | 160 | |
| 5,151,724 | 09/29/92 | Kikinis      357 | 17 | |
| 5,151,763 | 09/29/92 | Marek et al. 357 | 26 | |
| 5,153,770 | 10/06/92 | Harris  359  245 | | |
| 5,155,604 | 10/13/92 | Miekka et al. 359 | 2 | |
| 5,155,615 | 10/13/92 | Tagawa       359 | 213 | |
| 5,155,778 | 10/13/92 | Magel et al. 385 | 18 | |
| 5,155,812 | 10/13/92 | Ehlig et al. 395 | 275 | |
| 5,157,304 | 10/20/92 | Kane et al.  313 | 495 | |
| 5,159,485 | 10/27/92 | Nelson       359 | 291 | |
| 5,161,042 | 11/03/92 | Hamada       359 | 41 | |
| 5,237,340 | 08/17/93 | Nelson       346 | 108 | |
| 5,237,435 | 08/17/93 | Kurematsu et al. | 359 | 41 |
| 5,239,448 | 08/24/93 | Perkins et al. 361 | 764 | |
| 5,239,806 | 08/31/93 | Maslakow     53 | 432 | |
| 5,240,818 | 08/31/93 | Mignardi et al. | 430 | 321 |
| 5,245,686 | 09/14/93 | Faris et al. 385 | 120 | |
| 5,247,180 | 09/21/93 | Mitcham et al. | 250 | 492.1 |
| 5,247,593 | 09/21/93 | Lin et al.   385 | 17 | |
| 5,249,245 | 09/28/93 | Lebby et al. 385 | 89 | |
| 5,251,057 | 10/05/93 | Guerin et al. 359 | 249 | |
| 5,251,058 | 10/05/93 | MacArthur    359 | 249 | |
| 5,254,980 | 10/19/93 | Hendrix et al. 345 | 84 | |
| 5,255,100 | 10/19/93 | Urbanus      358 | 231 | |
| 5,256,869 | 10/26/93 | Lin et al.   250 | 201.9 | |
| 5,258,325 | 11/02/93 | Spitzer et al. 437 | 86 | |
| 5,260,718 | 11/09/93 | Rommelmann et al. | 346 | 107 R |
| 5,260,798 | 11/09/93 | Um et al.    358 | 233 | |
| 5,262,000 | 11/16/93 | Welbourn et al. | 156 | 643 |
| 5,272,473 | 12/21/93 | Thompson et al. | 345 | 7 |
| 5,278,652 | 01/11/94 | Urbanus et al. 358 | 160 | |
| 5,278,925 | 01/11/94 | Boysel et al. 385 | 14 | |
| 5,280,277 | 01/18/94 | Hornbeck     345 | 108 | |
| 5,281,887 | 01/25/94 | Engle   310   335 | | |

UNITED STATES PATENT AND TRADEMARK OFFICE
CERTIFICATE OF CORRECTION

PATENT NO.    : 6,707,591 B2
DATED         : March 16, 2004
INVENTOR(S)   : David T. Amm It is certified that error appears in the above-identified patent and that said Letters Patent is hereby corrected as shown below:

<u>Title page,</u>
Item [56], References Cited, add the following:

| | | | | |
|---|---|---|---|---|
| 5,281,957 | 01/25/94 | Schoolman | 345 | 8 |
| 5,285,105 | 02/08/94 | Cain   257 | 672 | |
| 5,285,196 | 02/08/94 | Gale, Jr. | 345 | 108 |
| 5,285,407 | 02/08/94 | Gale et al. | 365 | 189.11 |
| 5,287,096 | 02/15/94 | Thompson et al. | 345 | 147 |
| 5,287,215 | 02/15/94 | Warde et al.   359 | 293 | |
| 5,289,172 | 02/22/94 | Gale, Jr. et al.   345 | 108 | |
| 5,291,317 | 03/01/94 | Newswanger   359 | 15 | |
| 5,291,473 | 03/01/94 | Pauli   369 | 112 | |
| 5,293,511 | 03/08/94 | Poradish et al.   257 | 434 | |
| 5,296,408 | 03/22/94 | Wilbarg et al.   437 | 203 | |
| 5,296,950 | 03/22/94 | Lin et al.   359 | 9 | |
| 5,298,460 | 03/29/94 | Nishiguchi et al. | 437 | 183 |
| 5,299,037 | 03/29/94 | Sakata 359 | 41 | |
| 5,299,289 | 03/29/94 | Omae et al.   359 | 95 | |
| 5,300,813 | 04/05/94 | Joshi et al.   257 | 752 | |
| 5,301,062 | 04/05/94 | Takahashi et al. | 359 | 567 |
| 5,303,055 | 04/12/94 | Hendrix et al.   348 | 761 | |
| 5,307,056 | 04/26/94 | Urbanus   340 | 189 | |
| 5,307,185 | 04/26/94 | Jones et al.   359 | 41 | |
| 5,310,624 | 05/10/94 | Ehrlich   430 | 322 | |
| 5,311,349 | 05/10/94 | Anderson et al. | 359 | 223 |
| 5,312,513 | 05/17/94 | Florence et al.   156 | 643 | |
| 5,313,479 | 05/17/94 | Florence   372 | 26 | |
| Des. 334,557 | 04/06/93 | Hunter et al.   D14 | 114 | |
| Des. 334,742 | 04/13/93 | Hunter et al.   D14 | 113 | |
| Des. 337,320 | 07/13/93 | Hunter et al.   D14 | 113 | |
| Re. 16,767 | 10/11/27 | Jenkins | | |
| Re. 25,169 | 05/15/62 | Glenn | | |
| DE 32 33 195 A1 | 03/17/83 | DE   H 01 L | 23/52 | |
| DE 43 23 799 A1 | 01/20/94 | DE   H 01 L | 23/50 | |
| DE 197 23 618 A1 | 12/11/97 | DE   G 03 F | 1/14 | |
| DE 197 51 716 A1 | 05/28/98 | DE   G 02 B | 27/14 | |
| DE 198 46 532 C1 | | DE   G 02 B | 27/09 | |
| 0 089 044 A2 | 09/21/83 | EP   H 01 L | 23/10 | |
| 0 261 901 A2 | 03/30/88 | EP   G09G  3/36 | | |
| 0 304 263 A2 | 02/22/89 | EP   H 01 L | 25/065 | |
| 0 306 308 A2 | 03/08/89 | EP   H 04 N | 3/14 | |
| 0 314 437 A1 | 10/25/88 | EP   H 01 L | 25/08 | |
| 0 322 714 A2 | 07/05/89 | EP   G 02 B | 5/30 | |
| 0 417 039 A1 | 03/13/91 | EP   G 03B  21/20 | | |
| 0 423 513 A2 | 04/24/91 | EP   H01S  3/085 | | |
| 0 436 738 A1 | 07/17/91 | EP   H04N  5/74 | | |
| 0 458 316 A2 | 11/27/91 | EP   G06K  11/06 | | |
| 0 477 566 A2 | 04/01/92 | EP   G02B  26/08 | | |
| 0 488 326 A3 | 06/03/92 | EP   G09G  3/28 | | |
| 0 499 566 A2 | 08/19/92 | EP   G06F  3/033 | | |
| 0 528 646 A1 | 02/24/93 | EP   G09G  3/02 | | |

UNITED STATES PATENT AND TRADEMARK OFFICE
CERTIFICATE OF CORRECTION

PATENT NO. : 6,707,591 B2
DATED : March 16, 2004
INVENTOR(S) : David T. Amm

It is certified that error appears in the above-identified patent and that said Letters Patent is hereby corrected as shown below:

<u>Title page,</u>
Item [56], References Cited, add the following:

| | | | | |
|---|---|---|---|---|
| 0 530 760 A2 | 03/10/93 | EP | G09G | 3/34 |
| 0 550 189 A1 | 07/07/93 | EP | G02F | 1/315 |
| 0 610 665 A1 | 08/17/94 | EP | G09G | 3/34 |
| 0 627 644 A2 | 12/07/94 | EP | G02B | 27/00 |
| 0 627 644 A3 | 09/11/90 | EP | G02B | 27/00 |
| 0 627 850 A1 | 12/07/94 | EP | H04N | 5/64 |
| 0 643 314 A2 | 03/15/95 | EP | G02B | 27/00 |
| 0 654 777 A1 | 05/24/95 | EP | G09G | 3/34 |
| 0 658 868 A1 | 06/21/95 | EP | G 09G | 3/34 |
| 0 658 830 A1 | 12/06/95 | EP | G09G | 3/34 |
| 0 689 078 A1 | 12/27/95 | EP | G02B | 26/08 |
| 0 801 319 A1 | 10/15/97 | EP | G02B | 26/00 |
| 0 851 492 A2 | 07/01/98 | EP | H01L | 23/538 |
| 1 014 143 A1 | 06/28/00 | EP | G02B | 26/08 |
| GB 2 117 564 A | 10/12/83 | GB | H 01 L | 25/08 |
| GB 2 118 365 A | 10/26/83 | GB | H 01 L | 27/13 |
| GB 2 266 385 A | 10/27/93 | GB | G02B | 23/10 |
| GB 2 296 152 A | 06/19/96 | GB | H04N | 13/04 |
| GB 2 319 424 A | 05/20/98 | GB | H04N | 13/04 |
| JP 1-155637 | 06/19/89 | JP | H01L | 21/66 |
| JP 4-333015 | 11/20/92 | JP | G02B | 27/18 |
| JP 2219092 | 08/31/90 | JP | G09G | 3/28 |
| JP 3288369 | 03/15/02 | JP | G 02 B | 26/06 |
| JP 53-39068 | 04/10/78 | JP | H 01 L | 23/12 |
| JP 55-111151 | 08/27/80 | JP | H 01 L | 27/00 |
| JP 57-210638 | 12/24/82 | JP | H 01 L | 21/60 |
| JP 57-31166 | 02/19/82 | JP | H 01 L | 23/48 |
| JP 60-49638 | 03/18/85 | JP | H 01 L | 21/60 |
| JP 60-94756 | 05/27/85 | JP | H 01 L | 25/04 |
| JP 60-250639 | 12/11/85 | JP | H 01 L | 21/58 |
| JP 61-142750 | 06/30/86 | JP | H 01 L | 21/60 |
| JP 61-145838 | 07/03/86 | JP | H 01 L | 21/60 |
| JP 63-234767 | 09/30/88 | JP | H 04 N | 1/04 |
| JP 63-305323 | 12/13/88 | JP | G 02F | 1/13 |
| JP 40-1155637 | 06/19/89 | JP | H 01 L | 21/92 |
| JP 7-281161 | 10/27/95 | JP | G02F | 1/1333 |
| WO 90/13913 | 11/15/90 | WO | H 01 L | 23/10 |
| WO 92/12506 | 07/23/92 | WO | G09F | 9/37 |
| WO 93/02269 | 02/04/93 | WO | E 06B | 5/10 |
| WO 93/09472 | 05/13/93 | WO | G 03F | 7/20 |
| WO 93/18428 | 09/16/93 | WO | G02B | 2700 |
| WO 93/22694 | 11/11/93 | WO | G02B | 5/18 |
| WO 94/09473 | 04/28/94 | WO | G09G | 3/34 |
| WO 94/29761 | 12/22/94 | WO | G02B | 27/24 |
| WO 95/11473 | 04/27/95 | WO | G02B | 27/00 |
| WO 96/02941 | 02/01/96 | WO | H 01 L | 23/02 |
| WO 96/41217 | 12/19/96 | WO | G02B | 5/18 |
| WO 96/41224 | 12/19/96 | WO | G02B | 19/00 |

UNITED STATES PATENT AND TRADEMARK OFFICE
CERTIFICATE OF CORRECTION

PATENT NO.    : 6,707,591 B2
DATED         : March 16, 2004
INVENTOR(S)   : David T. Amm It is certified that error appears in the above-identified patent and that said Letters Patent is hereby corrected as shown below:

<u>Title page,</u>
Item [56], References Cited, add the following:

| | | | | | |
|---|---|---|---|---|---|
| WO 97/22033    | 06/19/97 | WO | G02B | 27/22  |   |
| WO 97/26569    | 07/24/97 | WO | G02B | 5/18   |   |
| WO 98/05935    | 02/12/98 | WO | G01L | 9/06   |   |
| WO 98/24240    | 06/04/98 | WO | H04N | 9/31   |   |
| WO 98/41893    | 09/24/98 | WO | G02B | 26/08  |   |
| WO 99/12208    | 03/11/99 | WO | H 01 L | 25/065 |   |
| WO 99/23520    | 05/14/99 | WO | G 02 B | 26/08 |   |
| WO 99/34484    | 07/08/99 | WO | H01S |        |   |
| WO 99/59335    | 11/18/99 | WO | H04N | 5/765  |   |
| WO 99/63388    | 12/09/99 | WO | G02B | 27/22  |   |
| WO 00/04718    | 01/27/00 | WO | H04N | 7/167  |   |
| WO 00/07225    | 02/10/00 | WO | H01L | 21/00  |   |
| WO 01/006297 A3 | 01/25/01 | WO | G02B | 27/10 |   |
| WO 01/57581 A3 | 08/09/01 | WO | G02B | 27/48  |   |
| WO 02/025348 A3 | 03/28/02 | WO | G02B | 26/02 | X |
| WO 02/31575 A2 | 04/18/02 | WO | G02B | 27/00  | X |
| WO 02/058111 A2 | 07/25/02 | WO | H01L |       | X |
| WO 02/065184 A3 | 08/22/02 | WO | G02B | 27/12 | X |
| WO 02/073286 A2 | 09/19/02 | WO | G02B | 26/08 | X |
| WO 02/084375 A1 | 10/24/02 | WO | G02B | 26/08 | X |
| WO 02/084397 A3 | 10/24/02 | WO | G02B | 27/18 | X |
| WO 03/001281 A1 | 01/03/03 | WO | G02F | 1/01  | X |
| WO 03/001716 A1 | 01/03/03 | WO | H04J | 14/02 | X |
| WO 03/012523 A1 | 02/13/03 | WO | G02B | 26/00 | X |
| WO 03/016965 A1 | 02/27/03 | WO | G02B | 5/18  | X |
| WO 03/023849 A1 | 03/20/03 | WO | H01L | 23/02 | X |
| WO 03/025628 A2 | 03/27/03 | WO | G02B |       | X |

J. Neff, "Two-Dimensional Spatial Light Modulators: A Tutorial", Proceedings of the IEEE, vol. 78, No. 5 (May 1990), pp. 826-855.
R. Gerhard-Multhaupt, "Viscoelastic Spatial Light Modulators and Schlieren-Optical Systems for HDTV Projection Displays" SPIE vol. 1255 Large Screen Projection Displays II (1990), pp. 69-78.
R. Gerhard-Multhaupt, "Light-Valve Technologies for High-Definition Television Projection Displays", Displays vol. 12, No. 3/4 (1991), pp. 115-128.
O. Solgaard, F. Sandejas, and D. Bloom, "Deformable Grating Optical Modulator," Optics Letters, Vol. 17, No. 9, May 1, 1992, New York, USA, pp. 688-690.
F. Sandejas, R. Apte, W. Banyai, and D. Bloom, "Surface Microfabrication of Deformable Grating Valve for High Resolution Displays," The 7th International Conference on Solid-State Sensors and Actuators.
P. Alvelda, "High-Efficiency Color Microdisplays," SID 95 Digest, pages 307-311, 1995.
Worboys et al., "Miniature Display Technology for Integrated Helmut Systems," GEC Journal of Research, Vol. 10, No. 2, pages 111-118, Chelmsford, Essex, GB 1993.
M. Farn et al., "Color Separation by use of Binary Optics," Optics Letters, Vol. 18:15 pages 1214-1216, 1993.
P. Alvelda, "VLSI Microdisplays and Optoelectric Technology," MIT, pages 1-93, 1995.
P. Alvelda, "VLSI Microdisplay Technology," October 14, 1994.
D. Rowe, "Laser Beam Scanning," SPIE, Vol. 2088, Oct. 5, 1993, 18-26

UNITED STATES PATENT AND TRADEMARK OFFICE
CERTIFICATE OF CORRECTION

PATENT NO.    : 6,707,591 B2
DATED         : March 16, 2004
INVENTOR(S)   : David T. Amm It is certified that error appears in the above-identified patent and that said Letters Patent is hereby corrected as shown below:

Title page,
Item [56], References Cited, add the following:

L. Hornbeck, "Deformable-Mirror Spatial Light Modulators," Spatial Light Modulators and Applications III, Aug. 8, CA 1989, pp. 86-102
Russick et al., "Supercritical Carbon Dioxide Extraction of Solvent from Micromachined Structures," Supercritical Fluids, Chapter 18, American Chemical Society, pp 255-269, 1997.
Buhler et al., "Linear Array of Complementary Metal Oxide Semiconductor Double-Pass Metal Micromirrors," Optical Engineering, Vol. 36, No. 5, pp 1391-1398, May 1997.
Gani et al., "Variable Gratings for Optical Switching: Rigorous Electromagnetic Simulation and Design," Optical Engineering, Vol. 38, No. 3, pp 552-557, March 1999.
R. Tepe, et al. "Viscoelastic Spatial Light Modulator with Active Matrix Addressing," Applied Optics, Vol. 28, No. 22, New York, USA, pp.4826-4834, Nov. 15, 1989.
W. Brinker, et al., "Deformation Behavior of Thin Viscoelastic Layers Used in an Active-Matrix-Addressed Spatial Light Modulator," SPIE Vol. 1018, pp. 79-85, Germany, 1988.
T. Utsunomiya and H. Sato, "Electrically Deformable Echellette Grating and its Application to Tunable Laser Resonator," Electronics and Communications in Japan, Vol. 63-c, No. 10, pp. 94-100, Japan, 1980.
R.N. Thomas, et al., "The Mirror-Matrix Tube: A Novel Light Valve for Projection Displays", IEEE Transactions on Electron Devices, Vol. ED-22, No. 9, pp. 765-775, September 1975.
J. Guldberg, et al., " An Aluminum/SiO2/Silicon-on-Sapphire Light Valve Matrix for Projection Displays," Applied Physics Letters, Vol. 26, No. 7, pp. 391-393, April 1975.
"Kitchen Computer", IBM Technical Disclosure Bulletin, vol. 37, no. 12, pp. 223-225, December 1994.
"Image Orientation Sensing and Correction for Notepads", Research Disclosure, no. 34788, p. 217, March 1993.
Beck Mason et al., "Directly Modulated Sampled Grating DBR Lasers for Long-Haul WDM Communication Systems" IEEE Photonics Technology Letters, Vol. 9, No. 3, March 1997.pp. 377 of 379.
N. J. Frigo et al., "A Wavelength-Division Multiplexed Passive Optical Network with Cost-Shared Components", IEEE Photonics Technology Letters, Vol. 6, No. 11, November 1994, pp. 1365 of 1367.
M. S. Goodman et al., "The LAMBDANET Multiwavelength Network: Architecture, Applications, and Demonstrations", IEEE Journal on Selected Areas in Communications, Vol. 8, No. 6, August 1990, pp. 995 of 1004.
C. A. Turkatte, "Examining the Benefits of Tunable Lasers for Provisioning Bandwidth on Demand", EuroForum - Optical Components, February 2001, pp. 1 of 10.
R. Plastow, "Tunable Lasers and Future Optical Networks", Forum -Tunable Laser, August 2000, pp. 58 of 62.
Elizabeth Bruce, "Tunable Lasers", Communications, IEEE Spectrum, February 2002, pp. 35 of 39.
M. G. Littman et al., "Spectrally Narrow Pulsed Dye Laser without Beam Expander", Applied Optics, Vol. 17, No. 14, July 15, 1978, pp. 2224 of 2227.
S.T. Pai, et al., "Electromigration in Metals", Received June 4, 1976, pg. 103-115.
Olga B. Spahn, et al., "High Optical Power Handling of Pop-Up Microelectromechanical Mirrors", Sandia National Laboratories, IEEE 2000, pg. 51-52.
David M. Burns, et al. "Optical Power Induced Damage to Microelectromechanical Mirrors", Sensors and Actuators A 70, 1998, pg. 6-14.
V.S. Aliev et al., "Development of Si(100) surface roughness at the initial stage of etching in F2 and XeF2 gases: ellipsometric study," Surface Science 442 (1999), pgs. 206-214.

UNITED STATES PATENT AND TRADEMARK OFFICE
CERTIFICATE OF CORRECTION

PATENT NO. : 6,707,591 B2
DATED : March 16, 2004
INVENTOR(S) : David T. Amm

It is certified that error appears in the above-identified patent and that said Letters Patent is hereby corrected as shown below:

Title page,
Item [56], References Cited, add the following:

Xuan-Qi Wang et al., "Gas-Phase Silicon Etching with Bromine Trifluoride," Depart. of Electrical Engineering, 136-93 California Institute of Technology, 1997 IEEE, pgs. 1505-1508.
Harold F. Winters, "Etch products from the reaction of XeF2 with SiO2, Si3N4, SiC, and Si in the presence of Ion Bombardment," IBM Research Laboratory, 1983 American Vacuum Society, pgs. 927-931.
F.A. Houle, "Dynamics of SiF4 desorption during etching of silicon by XeF2," J. Chem. Phys. 87 (3), 1 August 1987, pgs. 1866-1872.
Mehran Mehregany, "Microelectromechanical Systems," 1993 IEEE, pgs. 14-22.
D. Moser et al., "A CMOS Compatible Thermally Excited Silicon Oxide Beam Resonator with Aluminium Mirror," Physical Electronics Laboratory, 1991 IEEE, pgs. 547-550.
M. Parameswaran et al., "Commerical CMOS Fabricated Integrated Dynamic Thermal Scene Simulator," 1991 IEEE, pgs. 29.4.1-29.4.4.
M. Parameswaran et al., "CMOS Electrothermal Microactuators," Depart. of Electrical Engineering, 1990 IEEE, pgs.128-131.
U. Streller et al., "Selectivity in dry etching of Si(100) with XeF2 and VUV light," Applied Surface Science 106, (1996), pgs. 341-346.
M.J.M Vugts et al., "Si/XeF2 etching: Temperature dependence," 1996 American Vacuum Society, pgs. 2766-2774.
P. Krummenacher et al., "Smart Temperature Sensor in CMOS Technology," Sensors and Actuators, A-21-A-23 (1990), pgs. 636-638.
Henry Baltes, "CMOS as sensor technology," Sensors and Actuators A. 37-38, (1993), pgs. 51-56.
Thomas Boltshauser et al., "Piezoresistive Membrane Hygrometers Based on IC Technology," Sensor and Materials, 5, 3, (1993), pgs. 125-134.
Z. Parpia et al., "Modelling of CMOS Compatible High Voltage Device Structures," pgs. 41-50.
Jon Gildemeister, "Xenon Difluoride Etching System," 1997, UC Berkeley MicroTabrication Manual Chapter 7.15, pg. 2-5.
W. Riethmuller et al., "A smart accelerometer with on-chip electronics fabricated by a commercial CMOS process," Sensors and Actuators A. 31, (1992), 121-124.
W. Gopel et al., "Sensors- A Comprehensive Survey," Vol. 7, Weinheim New York, 44 pgs.
D. E. Ibbotson et al., "Comparison of XeF2 and F-atom reations with Si and SiO2," 1984 American Institute of Physics, pgs. 1129-1131.
D. E. Ibbotson et al., "Plasmaless dry etching of silicon with fluorine-containing compounds," 1984 American Institute of Physics, pgs. 2939-2942.
M.H. Hecht et al., "A novel x-ray photoelectron spectroscopy study of the Al/SiO2 interfaces," 1985 American Institute of Physics, pgs. 5256-52616.
Daniel L. Flamm et al., "XeF2 and F-Atom Reactions with Si: Their Significance for Plasma Etching,," Solid State Technology, V. 26, #4, 4/83, pgs. 117-121.
H.F. Winters et al., "The etching of silicon with XeF2 vapor," Appl. Phys. Lett. Vol. 34, No. 1, January 1979, pgs. 70-73.
Wayne Bailey et al., "Microelectronic Structures and Microelectromechanical Devices for Optical Processing and Multimedia Applications," SPIE - The International Society for Optical Engineering, Vol. 2641, October 1995, 13 pgs.
J. Marshall et al., "Realizing Suspended Structures on Chips Fabricated by CMOS Foundry Processes Through the MOSIS Service," National Inst. of Standards and Technology, Jun 94, 63 pgs.
David Moser et al., "CMOS Flow Sensors," 1993 Physical Electronics Lab, Swiss Federal Institute of Tech, Zurich, Switzerland, 195 pgs.

UNITED STATES PATENT AND TRADEMARK OFFICE
CERTIFICATE OF CORRECTION

PATENT NO. : 6,707,591 B2
DATED : March 16, 2004
INVENTOR(S) : David T. Amm

It is certified that error appears in the above-identified patent and that said Letters Patent is hereby corrected as shown below:

Title page,
Item [56], References Cited, add the following:

E. Hecht, "Optics", Addison-Wesley, $2^{nd}$ edition, 1987, Adelphi University, pp. 163-169.
E. Hecht, "Optics", Addison-Wesley, $2^{nd}$ edition, 1987, Adelphi University, pp. 358-360.
T. Glaser et al., "Beam switching with binary single-order diffractive grating", XP-000802142, Optics Letters, December 15, 1998, Vol. 23, No. 24, pp. 1933 of 1935.
P. C. Kundu et al., "Reduction of Speckle Noise by Varying the Polarisation of Illuminating Beam", XP-002183475, Dept. of Applied Physics, Calcutta University, 1975, pp. 63-67.
J. W. Goodman, "Some Fundamental Properties of Speckle", XP-002181682, Dept. of Electrical Engineering, Stanford University, 1976, pp.1146-1150.
Lingli Wang et al., "Speckle Reduction in Laser Projection Systems by Diffractive Optical Elements", XP-000754330, Applied Optics, April 1, 1998, Vol. 37, No. 10, pp. 1770-1775.
R.W. Corrigan et al., "Calibration of a Scanned Linear Grating Light-Valve, Projection System for E-Cinema Applications", Silicon Light Machines, SID'99, San Jose, CA, 27 pgs, 1999.
R.W. Corrigan et al., "Calibration of a Scanned Linear Grating Light-Valve, Projection System", Silicon Light Machines, San Jose, CA, 4 pgs, May 18, 1999.
"Introduction to Cryptography", http://www.ssh.fi/tech/crpto/into.html, 35 pgs, June 21, 1999.
"Deep Sky Black," Equinox Interscience, www.eisci.com/deepsky.html, 1997.
"Absorptive Neutral Density Filters," Newport Corp., Irvine, CA, www.newport.com, 5/7/99.
"High Energy Variable Attenuators," Newport Corp., Irvine, CA, www.newport.com, 5/7/99.
"Neutral-Density Filters," New Focus, Inc., Santa Clara, CA, www.newfocus.com, 5/7/99.
J. Hawkes et al., "Laser Theory and Practice," Prentice Hall, New York, 1995, pp. 407-408.
C. Tew et al., "Electronic Control of a Digital Micromirror Device for Projection Displays", Proceedings of the 1994 IEEE International Solid-State Circuits Conference, 1994.
Henck, S.A., "Lubrication of Digital Mircomirror Devices™", Tribology Letters, No. 3, pp. 239-247, 1997.
K. W. Goossen et al., "Silicon Modulator Based on Mechanically-Active Anti-Reflection Layer with 1 Mbit/sec Capability for Fiber-in-the-Loop Applications", IEEE Protonics Technology Letters, Vol. 6, No. 9, September 1994, pp. 1119-1121.
J. A. Walker et al., "Demonstration of a Gain Flattened Optical Amplifier with Micromechanical Equalizer Element", Lucent Technologies, pp. 13-14.
A. P. Payne et al., "Resonance Measurements of Stresses in $Al/Si_3N_4$ Micro-Ribbons", Silicon Light Machines, September 22, 1999, 11 pgs.
M. W. Miles, "A New Reflective FPD Technology Using Interferometric Modulation", 4 pgs.
N. A. Riza et al., "Digitally Controlled Fault-Tolerant Multiwavelength Programmable Fiber-Optic Attenuator Using a Two-Dimensional Digital Micromirror Device", OPTICS LETTERS, March 1, 1999, Vol. 24, No. 5, pp. 282-284.
N. A. Riza et al., "Synchronous Amplitude and Time Control for an Optimum Dynamic Range Variable Photonic Delay Line", APPLIED OPTICS, April 10, 1999, Vol. 38, No. 11, pp. 2309-2318.
P. Alvelda et al., "44.4: Ferroelectric Microdisplays Using Distortion-Compensated Pixel Layouts", SID 95 DIGEST, XP 2020715, pp. 931-933.--

UNITED STATES PATENT AND TRADEMARK OFFICE
CERTIFICATE OF CORRECTION

PATENT NO. : 6,707,591 B2
DATED : March 16, 2004
INVENTOR(S) : David T. Amm

It is certified that error appears in the above-identified patent and that said Letters Patent is hereby corrected as shown below:

<u>Column 6,</u>
Line 29, replace "display 25 screen 58" with -- display screen 58 --.

Signed and Sealed this

Seventh Day of September, 2004

JON W. DUDAS
*Director of the United States Patent and Trademark Office*